US012709497B2

(12) United States Patent
Criswell et al.

(10) Patent No.: US 12,709,497 B2
(45) Date of Patent: Aug. 18, 2026

(54) PERCEPTION-BASED ROBOTIC MANIPULATION SYSTEM AND METHOD FOR ROBOTIC TRUCK UNLOADER THAT UNLOADS/UNPACKS PRODUCT FROM TRAILERS AND CONTAINERS

(71) Applicants: Daifuku Intralogistics America Corporation, Hobart, IN (US); Daifuku Co., Ltd., Osaka (JP)

(72) Inventors: Tim Criswell, Dallas, TX (US); Justry Weir, Colorado Springs, CO (US); Alex Criswell, Dallas, TX (US); Pavlos Doliotis, Portland, OR (US); Samarth Rajan, Dallas, TX (US); Matthew Middleton, Auckland (NZ)

(73) Assignees: Daifuku Intralogistics America Corporation, Hobart, IN (US); Daifuku Co., Ltd., Osaka (JP)

( * ) Notice: Subject to any disclaimer, the term of this patent is extended or adjusted under 35 U.S.C. 154(b) by 336 days.

(21) Appl. No.: 18/610,562

(22) Filed: Mar. 20, 2024

(65) Prior Publication Data

US 2024/0351805 A1 Oct. 24, 2024

Related U.S. Application Data

(63) Continuation of application No. PCT/US2022/077023, filed on Sep. 26, 2022.
(Continued)

(51) Int. Cl.
*G06F 7/00* (2006.01)
*B65G 41/00* (2006.01)
(Continued)

(52) U.S. Cl.
CPC ........... *B65G 67/24* (2013.01); *B65G 41/002* (2013.01); *B65G 43/08* (2013.01); *B65G 43/10* (2013.01);
(Continued)

(58) Field of Classification Search
CPC ........ B65G 67/00; B65G 67/02; B65G 67/04; B65G 67/24; B65G 67/26;
(Continued)

(56) References Cited

U.S. PATENT DOCUMENTS 3,356,236 A 12/1967 Shaw et al.
3,717,263 A 2/1973 McWilliams
(Continued)

FOREIGN PATENT DOCUMENTS

CA 3139864 A1 * 12/2020 ........... B65G 41/003
CN 112278911 A * 1/2021 ............. B65G 67/24
(Continued)

OTHER PUBLICATIONS

International Search Report and Written Opinion dated Sep. 8, 2008 for International Application No. PCT/US2008/006663; 9 pp.
(Continued)

*Primary Examiner* — Yolanda R Cumbess
(74) *Attorney, Agent, or Firm* — Scott Griggs; Griggs Bergen LLP

(57) ABSTRACT

A robotic truck unloader for unloading/unpacking product, such as boxes or cases, from trailers and containers is disclosed. In one embodiment, a mobile base structure provides a support framework for a drive subassembly, a conveyance subassembly, an industrial robot, a pivoting front conveyor, a distance measurement subassembly, and a control subassembly. The control subassembly coordinates the selective articulated movement of the industrial robot and the pivoting front conveyor as well as the activation of
(Continued)

the drive subassembly based upon a perception-based robotic manipulation system. The robotic truck unloader executes pick-and-scoop operations utilizing the industrial robot and the pivoting front conveyor. Automated error handling is also provided.

20 Claims, 20 Drawing Sheets

Related U.S. Application Data

(60) Provisional application No. 63/248,113, filed on Sep. 24, 2021.

(51) Int. Cl.

| | |
|---|---|
| ***B65G 43/08*** | (2006.01) |
| ***B65G 43/10*** | (2006.01) |
| ***B65G 61/00*** | (2006.01) |
| ***B65G 67/24*** | (2006.01) |
| ***B65G 67/26*** | (2006.01) |

(52) U.S. Cl.
CPC ............. *B65G 61/00* (2013.01); *B65G 67/26* (2013.01); *B65G 2203/0233* (2013.01); *B65G 2203/041* (2013.01)

(58) Field of Classification Search
CPC .. B65G 41/00–005; B65G 41/007–008; B65G 43/00; B65G 43/02–10; B65G 61/00; B65G 2203/0233; B65G 2203/041; B65G 2201/025; G05B 2219/40006–40008; G05B 2219/40298; G05B 2219/40607
USPC .................................................. 700/213, 230
See application file for complete search history.

(56) References Cited

U.S. PATENT DOCUMENTS

| | | | | |
|---|---|---|---|---|
| 3,756,431 | A | 9/1973 | Evans et al. | |
| 3,853,230 | A | 12/1974 | Schultz | |
| 3,931,897 | A | 1/1976 | Bacon et al. | |
| 3,939,994 | A | 2/1976 | Suzzi | |
| 4,585,384 | A | 4/1986 | Richard et al. | |
| 4,636,137 | A | 1/1987 | Lemelson | |
| 4,643,629 | A | 2/1987 | Takahashi et al. | |
| 4,680,519 | A | 7/1987 | Chand et al. | |
| 5,002,457 | A | 3/1991 | Dorner et al. | |
| 5,015,145 | A | 5/1991 | Angell et al. | |
| 5,069,592 | A | 12/1991 | Galperin | |
| 5,087,169 | A | 2/1992 | Tubke | |
| 5,125,298 | A | 6/1992 | Smith | |
| 5,219,264 | A | 6/1993 | McClure et al. | |
| 5,256,021 | A | 10/1993 | Wolf et al. | |
| 5,325,953 | A | 7/1994 | Doster et al. | |
| 5,326,218 | A | 7/1994 | Fallas | |
| 5,366,024 | A | 11/1994 | Payne | |
| 5,426,921 | A | 6/1995 | Beckmann | |
| 5,455,669 | A | 10/1995 | Wettebom | |
| 5,685,416 | A | 11/1997 | Bonnet | |
| 5,908,283 | A | 6/1999 | Huang et al. | |
| 6,015,174 | A | 1/2000 | Raes et al. | |
| 6,016,368 | A | 1/2000 | Koomen | |
| 6,115,128 | A | 9/2000 | Vann | |
| 6,273,670 | B1 | 8/2001 | Henson et al. | |
| 6,350,098 | B1 | 2/2002 | Christenson et al. | |
| 6,522,951 | B2 | 2/2003 | Born et al. | |
| 6,571,532 | B1 | 6/2003 | Wiernicki et al. | |
| 6,591,593 | B1 | 7/2003 | Brandon et al. | |
| 6,609,719 | B2 | 8/2003 | Helen | |
| 6,612,011 | B2 | 9/2003 | Mayr et al. | |
| 6,659,263 | B2 | 12/2003 | Hendrickson et al. | |
| 6,662,931 | B2 | 12/2003 | Bruun et al. | |
| 6,699,007 | B2 | 3/2004 | Huang et al. | |
| 6,869,267 | B2 | 3/2005 | Pfeiffer et al. | |
| 6,874,615 | B2 | 4/2005 | Fallas | |
| 6,896,474 | B2 | 5/2005 | Guidetti | |
| 6,974,928 | B2 | 12/2005 | Bloom | |
| 7,047,710 | B2 | 5/2006 | Winkler | |
| 7,967,543 | B2 | 6/2011 | Criswell et al. | |
| 8,562,277 | B2 | 10/2013 | Criswell | |
| 9,434,558 | B2 | 9/2016 | Criswell | |
| 9,533,841 | B1 | 1/2017 | Criswell | |
| 9,694,994 | B2 | 7/2017 | Criswell | |
| 9,701,492 | B2 | 7/2017 | Criswell | |
| 9,828,195 | B1 | 11/2017 | Criswell | |
| 10,035,667 | B2 | 7/2018 | Criswell | |
| 10,266,351 | B2 | 4/2019 | Criswell | |
| 10,343,855 | B2 | 7/2019 | Criswell | |
| 11,261,038 | B2 | 3/2022 | Criswell | |
| 2001/0026755 | A1 | 10/2001 | Wood et al. | |
| 2001/0028838 | A1 | 10/2001 | Leimbach et al. | |
| 2004/0069854 | A1 | 4/2004 | Good et al. | |
| 2005/0047895 | A1 | 3/2005 | Lert | |
| 2005/0105990 | A1 | 5/2005 | Maclay | |
| 2005/0128060 | A1 | 6/2005 | Rennick et al. | |
| 2005/0135912 | A1 | 6/2005 | Schempf et al. | |
| 2005/0278193 | A1 | 12/2005 | Kibbler | |
| 2006/0016610 | A1 | 1/2006 | Pohlman et al. | |
| 2006/0106487 | A1 | 5/2006 | Allen et al. | |
| 2006/0156694 | A1 | 7/2006 | Aubin et al. | |
| 2007/0280812 | A1 | 12/2007 | Morency et al. | |
| 2008/0267756 | A1 | 10/2008 | Echelmeyer et al. | |
| 2009/0110522 | A1 | 4/2009 | Criswell | |
| 2009/0306812 | A1 | 12/2009 | Cottone et al. | |
| 2010/0239408 | A1 | 9/2010 | Becker et al. | |
| 2011/0139576 | A1 | 6/2011 | Johannsen | |
| 2012/0177467 | A1 | 7/2012 | Corrigan et al. | |
| 2013/0230373 | A1 | 9/2013 | Pippin | |
| 2013/0272828 | A1 | 10/2013 | Andre et al. | |
| 2016/0280477 | A1 | 9/2016 | Pippin | |
| 2017/0113885 | A1 | 4/2017 | Criswell | |
| 2018/0072517 | A1 | 3/2018 | Girtman et al. | |
| 2019/0084769 | A1 * | 3/2019 | Clucas | B65G 47/244 |

FOREIGN PATENT DOCUMENTS

| | | | | |
|---|---|---|---|---|
| DE | 102007054867 | 5/2009 | | |
| EP | 0869455 | 10/1998 | | |
| KR | 20210044846 A * | 4/2021 | | B25J 15/0616 |
| WO | 2019178275 | 9/2019 | | |

OTHER PUBLICATIONS

International Search Report and Written Opinion dated Sep. 25, 2008 for International Application No. PCT/US2008/006624; 8 pp.

International Search Report and Written Opinion dated Dec. 30, 2022 for International Application No. PCT/US2022/077023; 12 pp.

International Search Report and Written Opinion dated May 14, 2014 for International Application No. PCT/US2014/012215; 10 pp.

Wynright. Robotics Solutions. Robotic Truck Unloader (RTU). Feb. 28, 2012 (retrieved on Apr. 28, 2014); 2 pp. Retrieved from the internet: <URL: http://www.roboticsbusinessreview.com/images/gc/wynright_rtu.pdf>.

European Patent Office; Extended European Search Report dated Apr. 25, 2017 for European Patent Application No. 14740293.7; 6 pp.

* cited by examiner 230
240
284
282
238
236
+z
-z
244
260
T
280
278
292
276
274
290
272
270
288
268
266
286
264
262
250
258
242

250
262
258
264
266
268
270
272
274
276
278
280
260
244
242
42
82
238
84
234

10
194
User Interface
370
Operational Environment Data
372
PLC
374
Robot Controller
DMS
170
Visual Detection
174
176
162
40
Drive Subassembly
Conveyor/ Elevator Controller
Safety Controller
Robot
Camera
377
52
376
378
377
Camera
Pivoting Front Conveyor Controller
375
Pivoting Front Conveyor
42
Sensors
282
284

PERCEPTION-BASED ROBOTIC MANIPULATION SYSTEM AND METHOD FOR ROBOTIC TRUCK UNLOADER THAT UNLOADS/UNPACKS PRODUCT FROM TRAILERS AND CONTAINERS

PRIORITY STATEMENT & CROSS-REFERENCE TO RELATED APPLICATIONS

This application is a continuation of International Patent Application No. PCT/US2022/077023, entitled "PERCEPTION-BASED ROBOTIC MANIPULATION SYSTEM AND METHOD FOR ROBOTIC TRUCK UNLOADER THAT UNLOADS/UNPACKS PRODUCT FROM TRAILERS AND CONTAINERS" and filed on Sep. 26, 2022, in the name of Tim Criswell et al.; which claims priority to U.S. Patent Provisional Patent Application No. 63/248,113 entitled "PERCEPTION-BASED ROBOTIC MANIPULATION SYSTEM AND METHOD FOR ROBOTIC TRUCK UNLOADER THAT UNLOADS/UNPACKS PRODUCT FROM TRAILERS AND CONTAINERS" and filed on Sep. 24, 2021, in the name of Tim Criswell et al; all of which are hereby incorporated by reference, in entirety, for all purposes.

This application discloses subject matter related to the subject matter disclosed in the following commonly owned, co-pending patent applications:

- U.S. patent application Ser. No. 18/610,499 entitled "Perception-Based Robotic Manipulation System and Method for Robotic Truck Unloader that Unloads/Unpacks Product from Trailers and Containers" filed on Mar. 20, 2024;
- U.S. patent application Ser. No. 18/610,535 entitled "Perception-Based Robotic Manipulation System and Method for Robotic Truck Unloader that Unloads/Unpacks Product from Trailers and Containers" filed on Mar. 20, 2024;
- U.S. patent application Ser. No. 18/610,549 entitled "Perception-Based Robotic Manipulation System and Method for Robotic Truck Unloader that Unloads/Unpacks Product from Trailers and Containers" filed on Mar. 20, 2024;
- U.S. patent application Ser. No. 18/610,587 entitled "Perception-Based Robotic Manipulation System and Method for Robotic Truck Unloader that Unloads/Unpacks Product from Trailers and Containers" filed on Mar. 20, 2024; and
- U.S. patent application Ser. No. 18/610,599 entitled "Perception-Based Robotic Manipulation System and Method for Robotic Truck Unloader that Unloads/Unpacks Product from Trailers and Containers" filed on Mar. 20, 2024;

all of which are hereby incorporated by reference, in entirety, for all purposes.

TECHNICAL FIELD OF THE INVENTION

This invention relates, in general, to a machine for handling products and, more particularly, to a perception-based robotic manipulation system and method for automated unloading and unpacking which employs a robotic truck unloader designed to unload and unpack product, such as parcels or boxes, from trailers and containers.

BACKGROUND OF THE INVENTION

Loading docks and loading bays are commonly found in large commercial and industrial buildings and provide arrival and departure points for large shipments brought to or taken away by trucks and vans. By way of example, a truck may back into a loading bay such that the bumpers of the loading bay contact the bumpers on the trailer and a gap is created between the loading bay and the truck. A dock leveler or dock plate bridges the gap between the truck and a warehouse to provide a fixed and substantially level surface. Power moving equipment, such as forklifts or conveyor belts, is then utilized to transport the cargo from the warehouse to the truck. Human labor then removes the cargo in the truck. This is particularly true of the unloading of product, such as boxes or cases, from a truck, or freight container, for example. These systems are designed to maximize the amount of cargo unloaded while minimizing the use of human labor to both protect and extend the life of the workforce. Reducing human labor, however, has proven difficult as the configuration and size of the boxes in the truck or freight container cannot be easily predicted in advance. Therefore, a need still exists for improved truck unloading systems that further reduce the use of human labor when unloading or unpacking product, such as cases and boxes, from trailers and containers.

SUMMARY OF THE INVENTION

It would be advantageous to achieve a system and method for automated unloading and unpacking of product, such as parcels or boxes, that would enable a trailer or container to be fully unloaded using minimal or no human labor, thereby minimizing the time to unload the truck and the need for human capital. It would also be desirable to enable a robotic computer-based solution that would address this problem, and particularly issues with perception, by unloading and unstacking—quickly—trailers, and similar containers, with parcels and boxes of varying sizes. To better address one or more of these concerns, in one embodiment, a robotic truck unloader for unloading/unpacking product, such as boxes or cases, from trailers and containers is disclosed. A mobile base structure provides a support framework for a drive subassembly, a conveyance subassembly, an industrial robot, a pivoting front conveyor, a distance measurement subassembly, which may include a camera, for example, and a control subassembly. The control subassembly coordinates the selective articulated movement of the industrial robot and the pivoting front conveyor as well as the activation of the drive subassembly based upon a perception-based robotic manipulation system. The robotic truck unloader executes pick-and-scoop operations utilizing the industrial robot and the pivoting front conveyor. Automated error handling is also provided.

In one aspect, the robotic truck unloader for unloading/unpacking product includes a mobile base structure having a drive subassembly and a conveyance subassembly secured therewith. An industrial robot and a pivoting front conveyor are disposed on the mobile base. A control subassembly is located in communication with the industrial robot, the pivoting front conveyor, and a perception subsystem to coordinate selective articulated movement of each of the industrial robot and the pivoting front conveyor. The control subassembly, which includes a memory having processor-executable instructions accessible to a processor, enables the perception subsystem to construct a searchable space from data collected from the environment. The searchable space is searched to determine a candidate product contact face. The robotic truck unloader then specifies a removal operation to unload the product with a pick-and-scoop operation using the industrial robot and the pivoting front conveyor.

The pick portion of the pick-and-scoop operation may include a grasp and pull, for example. The robotic truck unloader also performs automated error handling by searching the pivoting front conveyor to identify a product in-handling that remains located on the pivoting front conveyor and handling the product in-handling.

In another aspect, the robotic truck unloader for unloading/unpacking product includes a mobile base structure having a drive subassembly and a conveyance subassembly secured therewith. A pivoting front conveyor having a frame is disposed on the mobile base and configured to handle the product. The pivoting front conveyor includes a deck conveyor unit integrated within the frame. A planar, elongated blade exhibiting a rear portion is connected to the frame. The planar, elongated blade may have a front portion extending a length from the rear portion along a transverse axis between first and second lateral sides. The planar, elongated blade, in response to applied pressure, flexes about the transverse axis. A control subassembly may be located in communication with the pivoting front conveyor and a perception subsystem to coordinate selective articulated movement of each of the industrial robot and the pivoting front conveyor. The control subassembly, which includes a memory having processor-executable instructions accessible to a processor, enables the robotic truck unloader to construct a searchable space from data images collected by the camera, search the searchable space to determine a candidate product contact face, and specify a removal operation to unload the plurality of product with the pivoting front conveyor.

In a further aspect, a robotic truck unloader for unloading/unpacking product includes a mobile base structure having a drive subassembly and a conveyance subassembly secured therewith. An industrial robot and a pivoting front conveyor are disposed on the mobile base. A control subassembly may be located in communication with the industrial robot, the pivoting front conveyor, and a perception subsystem to coordinate selective articulated movement of each of the industrial robot the pivoting front conveyor. The control subassembly, which as previously mentioned, includes a memory having processor-executable instructions accessible to a processor, enables the robotic truck unloader to construct a searchable space from data images collected by the distance measurement subassembly. The searchable space is searched to determine a candidate product contact face. The robotic truck unloader may then specify a removal operation where the industrial robot clears a portion of the product from a foreground wall and then scoops clear the product. More particularly, the robotic truck unloader may then specify a removal operation to unload the product with a pick-and-scoop operation using the industrial robot and the pivoting front conveyor by specifying a pick with the industrial robot followed by two scoops, a shallow scoop and a deep scoop, by the pivoting front conveyor. In general, the industrial robot initiates a clearing on an upper portion of the product and the pivoting front conveyor initiates a clearing of a lower portion of the product.

In a still further aspect, a robotic truck unloader for unloading/unpacking product includes a mobile base structure having a drive subassembly and a conveyance subassembly secured therewith. An industrial robot and a pivoting front conveyor are disposed on the mobile base. Similar to the previous discussions, a control subassembly may be located in communication with the industrial robot, the pivoting front conveyor, and a perception subsystem to coordinate selective articulated movement of each of the industrial robot and the pivoting front conveyor. The control subassembly, which includes a memory having processor-executable instructions accessible to a processor, enables the robotic truck unloader to construct a searchable space from data images collected by the camera. The searchable space includes a foreground wall. The searchable space is searched to determine a candidate product contact face that has a particular relationship with respect to the foreground wall. The robotic truck unloader then specifies a removal operation to unload the product with a pick-and-scoop operation using the industrial robot and the pivoting front conveyor.

These systems and methodologies utilizing the present robotic truck unloader therefore maximize the amount the product and cargo unloaded while minimizing the use of human labor to both protect and extend the life of the workforce. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
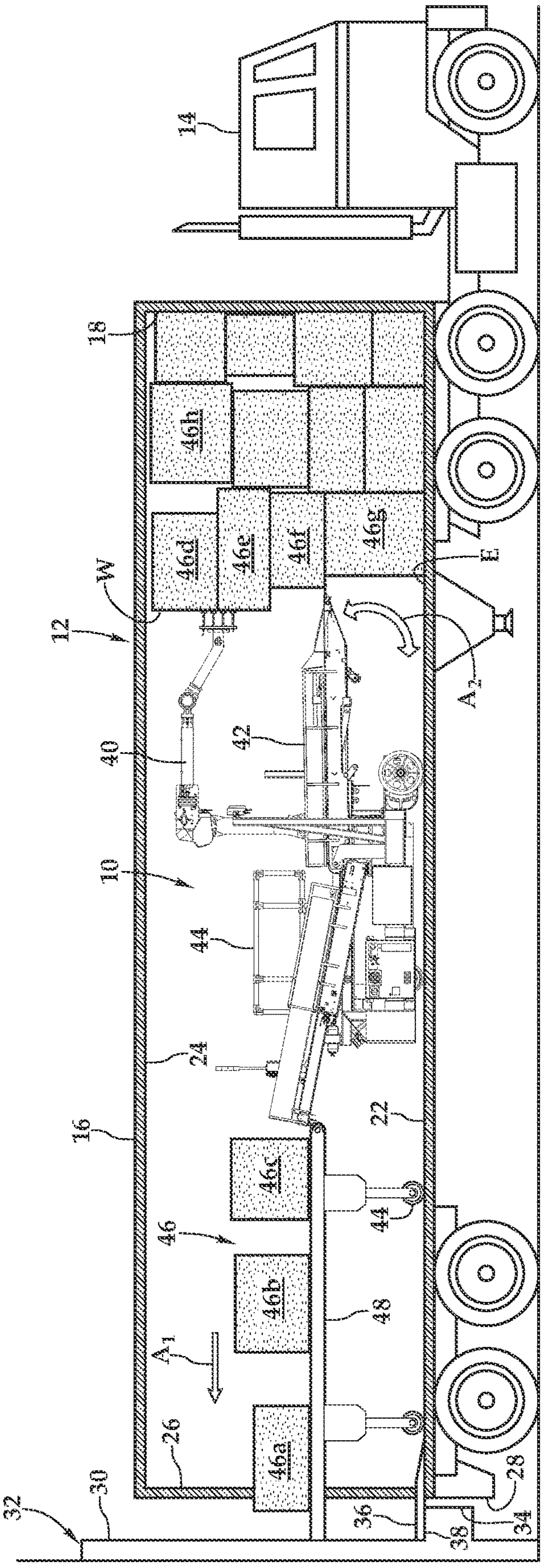
FIG. 1A is a side elevation view with partial cross-section of one embodiment of an automatic truck unloader, in a first operational configuration, utilizing a perception-based robotic manipulation system to unload product within a trailer of a truck, according to the teachings presented herein.

Referring initially to FIG. 1A, therein is depicted an automated robotic truck unloader that is schematically illustrated and generally designated 10 and may be referred to as the robotic truck unloader. This robotic truck unloader 10 is utilized in systems and methods for automated truck unloading of trailers, containers and the like. It should be appreciated however, that many of the concepts and teachings presented herein are applicable to systems and methods for automated truck loading and packing. A semi-trailer truck 12 having an operator cab 14 is towing a trailer 16 having an interior end wall 18, two side walls (unnumbered), a floor 22, a ceiling 24, and a rear access opening 26 accessible due to an open door. A bumper 28 of the trailer 16 is backed up to a loading bay 30 of loading dock 32 such that the bumper 28 touches a bumper 34 of the loading bay 30. A dock plate 36 bridges the gap between the floor 22 and a deck 38 of the loading dock 32.

As will be described in further detail hereinbelow, under the supervision of navigational and perception capabilities, which may include information from a distance measurement subassembly or subassemblies or other components of the robotic truck unloader 10, the robotic truck unloader 10 maneuvers and drives automatically into the trailer 16 to a position as proximate as possible to the front wall of the product W to perform pick-and-scoop parcel handling operations utilizing an industrial robot 40 and a pivoting front conveyor 42. The robotic truck unloader 10 operates independently of an operator and an operator is only necessary for certain types of troubleshooting, maintenance, and the like. To handle a stream of product 46, a telescoping conveyor unit 48 is connected to the robotic truck unloader 10 and the telescoping conveyor unit 48 is appropriately positionable and repositionable in the trailer 16 as the robotic truck unloader 10 moves forward and backward in the trailer 16. The stream of product 46, in the form of standard cases or boxes or bags or parcels **46*a*-46*h*, which may be of any dimension, is being supplied by the robotic truck unloader upon removal thereof, as shown by arrow $A_1$. It should be appreciated that although parcels 46*a*-46*h* are illustrated as the stream of product 46, there are no limitations on the type of product that may be included in the stream of product 46. In particular, the robotic truck unloader 10 has already unloaded boxes 46*a* through 46*c*, and others, for example, at the intersection of the product 46 proximate the interior end 18 and the floor 22. As shown, the robotic truck unloader 10 is unloading parcels 46*d*, 46*e*, 46*f*, 46*g*, which will be followed by parcel 46*h* and other product 46. The robotic truck unloader 10 alternates between unloading the product 46 and driving forward to create more opportunities to grip the product 46 between the interior end 18 and the robotic truck unloader 10 until the trailer 16 is at least partially unloaded of the product 46** and, in most instances, emptied.

Referring now to FIG. 1A through FIG. 1D, as discussed, the robotic truck unloader 10 performs pick-and-scoop parcel handling operations utilizing the industrial robot 40 and the pivoting front conveyor 42. In FIG. 1A, the robotic truck unloader 10 is positioned and then specifies a removal operation to unload the product with a pick operation using the industrial robot 40 to initially pick product 46, including parcels **46*d*, 46*e*, 46*f* which are located at a foreground product wall W of the product 46**. It should be appreciated that although in this example a single pick operation is depicted, any number of pick operations may be utilized.

Figure 1B:
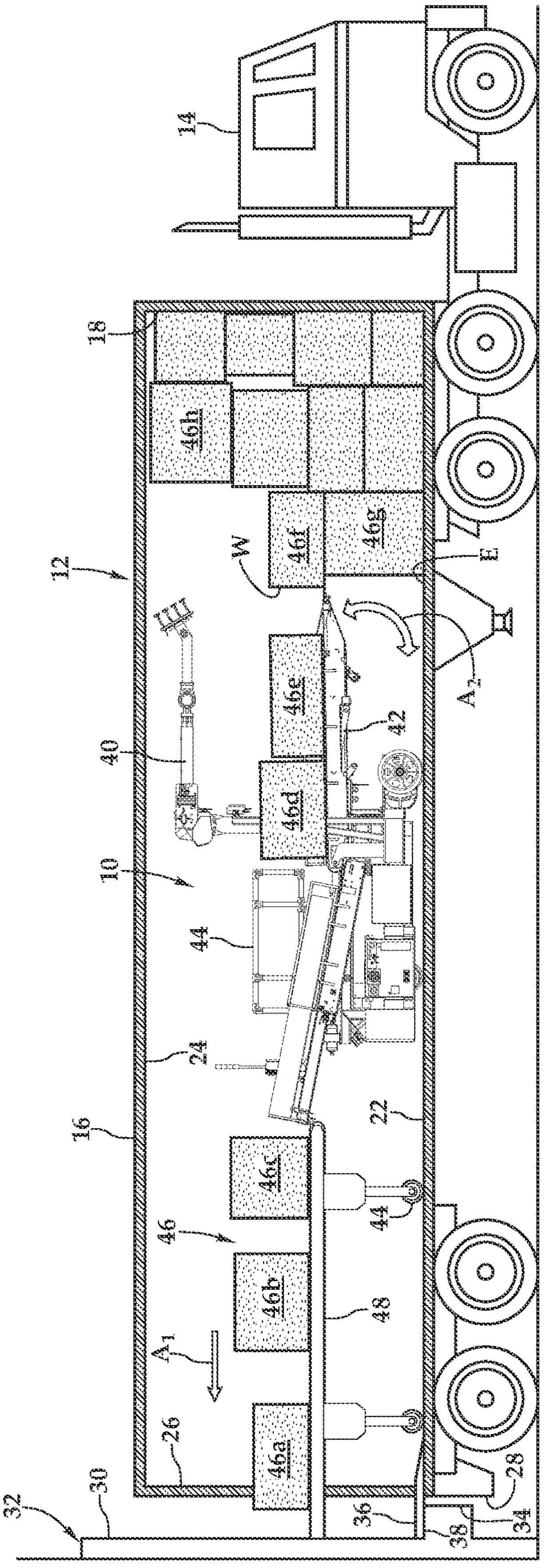
FIG. 1B is a side elevation view with partial cross-section of one embodiment of the automatic truck unloader depicted in FIG. 1A, in a second operational configuration.
Figure 1C:
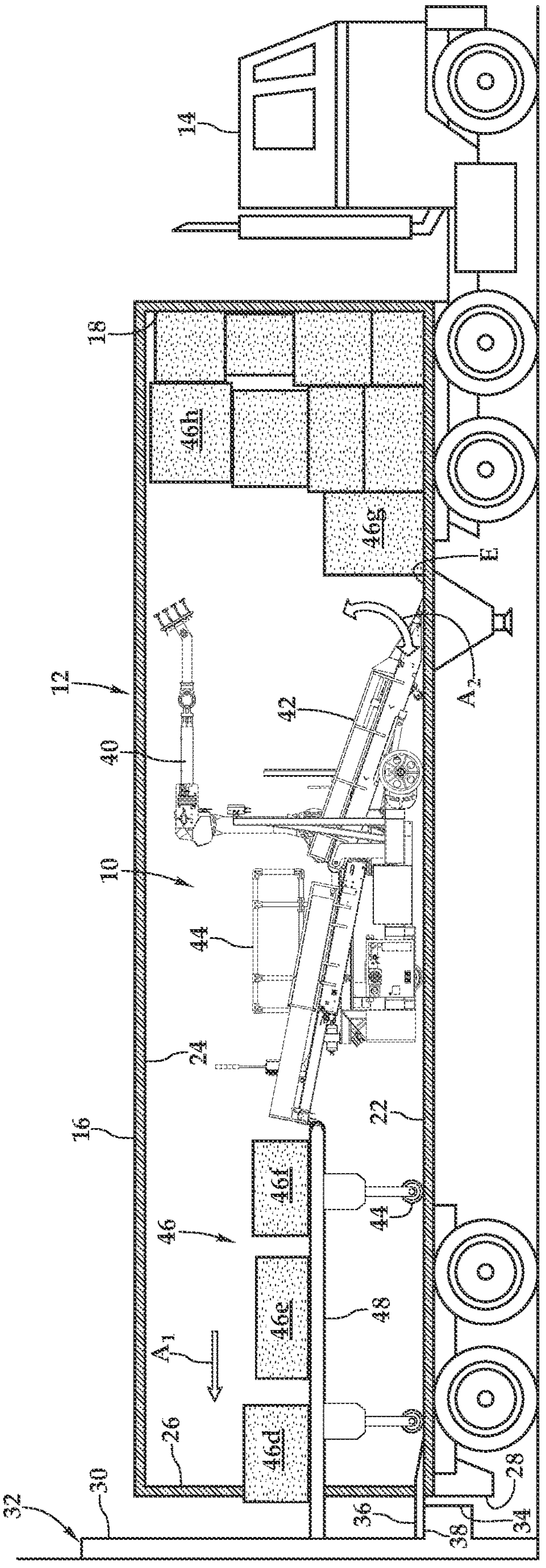
FIG. 1C is a side elevation view with partial cross-section of one embodiment of the automatic truck unloader depicted in FIG. 1A and FIG. 1B, in a third operational configuration.
Figure 1D:
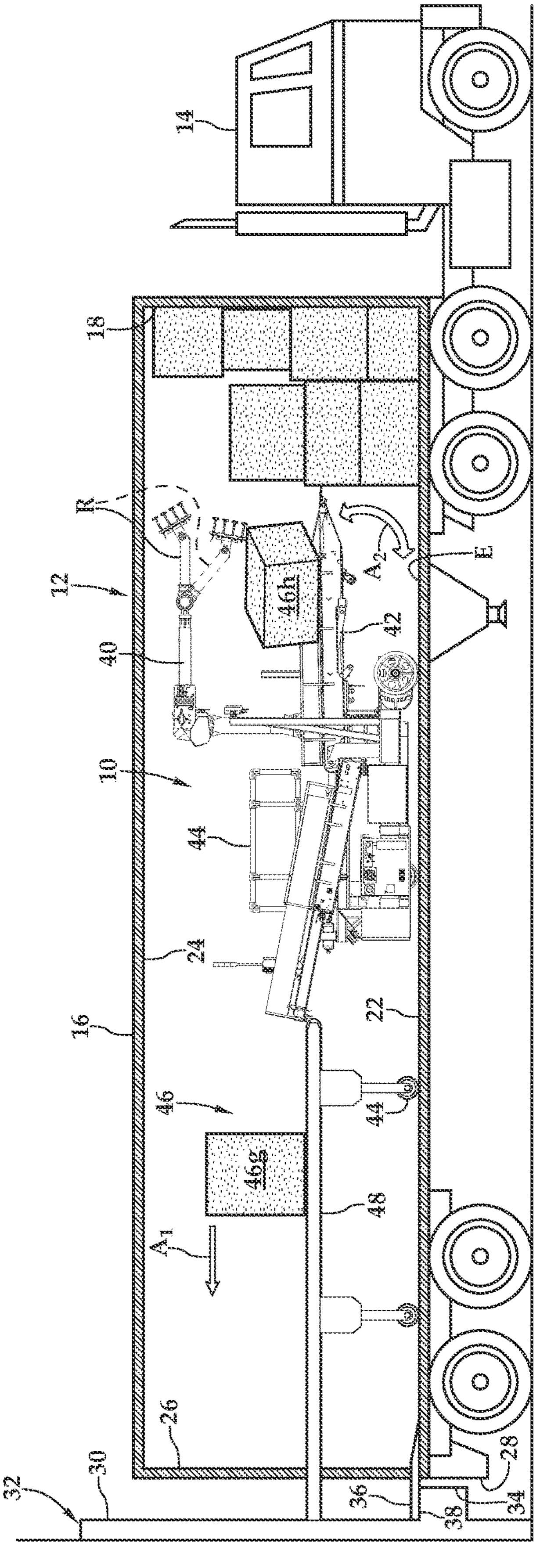
FIG. 1D is a side elevation view with partial cross-section of one embodiment of the automatic truck unloader depicted in FIG. 1A, FIG. 1B, and FIG. 1C, in a fourth operational configuration.

The pick operation may include grasping the product 46 and pulling the product 46 from the foreground product wall W. As part of the pick operation, the parcels **46*d*, 46*e* fall onto the pivoting front conveyor 42 above an evacuated front area E in front of the foreground product wall W. That is, as best seen in FIG. 1B, following the pick operation by the industrial robot 40, the robotic truck unloader 10 utilizes the pivoting front conveyor 42 to catch the product for conveyance out of the trailer 16. As shown in FIG. 1C, the remaining product 46*g* is then scooped as shown by arrow $A_2$. The pick and scoop operations transfer parcels 46*a* through 46*g* via conveyance to the telescoping conveyor unit 48 for further handling. As best seen in FIG. 1D, during a subsequent pick operation or operations, a parcel 46*h* is stuck on the pivoting front conveyor 42. In performing automated error handling, the robotic truck unloader 10 detects the parcel 46***h* stuck on the pivoting front conveyor 42 and performs an automated error handling operation as shown by the industrial robot 40 being repositioned, as shown by reference R, to free the parcel 46*h*.

FIG. 2A through FIG. 2H depict the robotic truck unloader 10 in further detail. A mobile base 50 supports a drive subassembly 52, a conveyance subassembly 54, the industrial robot 40, the pivoting front conveyor 42, a positioning subassembly 58, a safety subsystem 60, and a control subassembly 62, which interconnects the drive subassembly 52, the conveyance subassembly 54, the industrial robot 40, the pivoting front conveyor 42, the positioning subassembly 58, and the safety subsystem 60. The mobile base 50 includes a front end 64 and a rear end 66 as well as sides 68, 70, a surface 72, and an undercarriage 74.

The drive subassembly 52 is coupled to the undercarriage 74 of the mobile base 50 to provide mobility. As will be discussed in further detail hereinbelow, drive wheel assemblies 76, 78, are disposed on the undercarriage 74 proximate to the sides 68, 70 respectively. A universal wheel assembly 80 is disposed on the undercarriage 74 more proximate to the rear end 66 and centered between the sides 68, 70, respectively. Axillary front wheels 82, 84 are disposed under the pivoting front conveyor 42. In combination, wheel assemblies 76, 78, 80, 82, 84 provide forward and reverse drive and steering as well as, in some embodiments traverse drive and steering. Motor assemblies 86, 88 may also be disposed on the undercarriage 74 proximate to the intersection of the end 64 and side 68 as well as the intersection of end 66 and the side 70, respectively. As alluded to, in a forward or reverse drive and steering operation, such as moving into or out of the trailer 16, drive wheel assemblies 76, 78 and the universal wheel assembly 80 are actuated and in contact with the deck 38 of the loading dock 32 or the floor 22 of the tailer 16, with the motor assemblies 86, 88 providing power thereto. It should be appreciated that although the robotic truck unloader 10 is being described relative to unloading and unpacking, some of the teachings presented herein for the robotic truck unloader 10 may also be used to load and pack product, including boxes and cases, into a trailer.

The conveyance subassembly 54 is disposed on the surface 72 of the mobile base 50 to provide a powered transportation path 90 operable for measuring, separating, carrying, and stacking, as required by the application and job assignment of the robotic truck unloader 10, boxes, parcels and other product 46 from the front end 64 to the rear end 66 proximate to the industrial robot 40. As shown, the powered transportation path 90 includes a powered roller conveyor 92, which has roller elements, flanked by lateral skirt plates 94, 96 to guide the product 46 as the product 46 is transferred from the industrial robot 40 and the pivoting front conveyor 42 to a downstream location. The conveyance subassembly 54 as well as the telescoping conveyor unit 48 may also each be equipped with a series of end stop photo eyes to adjust the rate of automatic flow of product through the telescoping conveyor unit 42 and the conveyance subassembly 54. Such an implementation provides a steady and continuous flow of product, maintains proper box or product separation, and prevents unnecessary gaps between the product and product backups and jams.

The industrial robot 40 is disposed at the front end 64 and adapted to provide selective articulated movement of an end effector 100 between the powered transportation path 90 and a reachable space 102 such that the industrial robot 40 is operable to handle the product 46 in the reachable space 102. In one embodiment, the end effector 100 includes a gripper arm 104 adapted for manipulating product with a grappler plate 106 secured to a support frame 108 for attachment to the industrial robot 40 at a joint 110 that provides an adequate range of motion. In some embodiments, the mechanical design of the end effector 100 with the support frame 108 is angled in such a way that the industrial robot 40 may have a reach that can be optimized based on the orientation of the tool.

Multiple suction cups 112 are associated with a face 114 of the grappler plate 106. Bulkhead fittings 116 secure the multiple spring loaded plungers 112 to a back 118 of the grappler plate 106. Additionally, vacuum manifolds 120 at the back 118 provide pneumatic communication with the spring-loaded plungers 112. Suction cups 122 are mounted on the face 114 proximate to the spring loaded plungers 112. In operation, a vacuum is activated and by way of flow restrictors operates in the presence of product 46. In response to the presence of an object, such as parcels 46*d*, 46*e*, the vacuum manifolds 120 provide a vacuum force to grip the object via the suction cups 122. With this arrangement, the end effector is able to handle parcels presenting uneven faces and different sizes.

It should be appreciated, however, that any type of end effector 100 may be employed with the industrial robot 40 and the choice of end effector 100 will depend upon the product 46 and specific robotic truck unloader 10 application. By way of example, the gripper arm 104 with a single grappler plate 106 is preferred for unloading and unpacking boxes 46*a*-46*h* utilizing a pick methodology. It should be understood, however, that the product 46 may be any type of good such as other cased or non-cased objects requiring unloading.

Figure 2A:
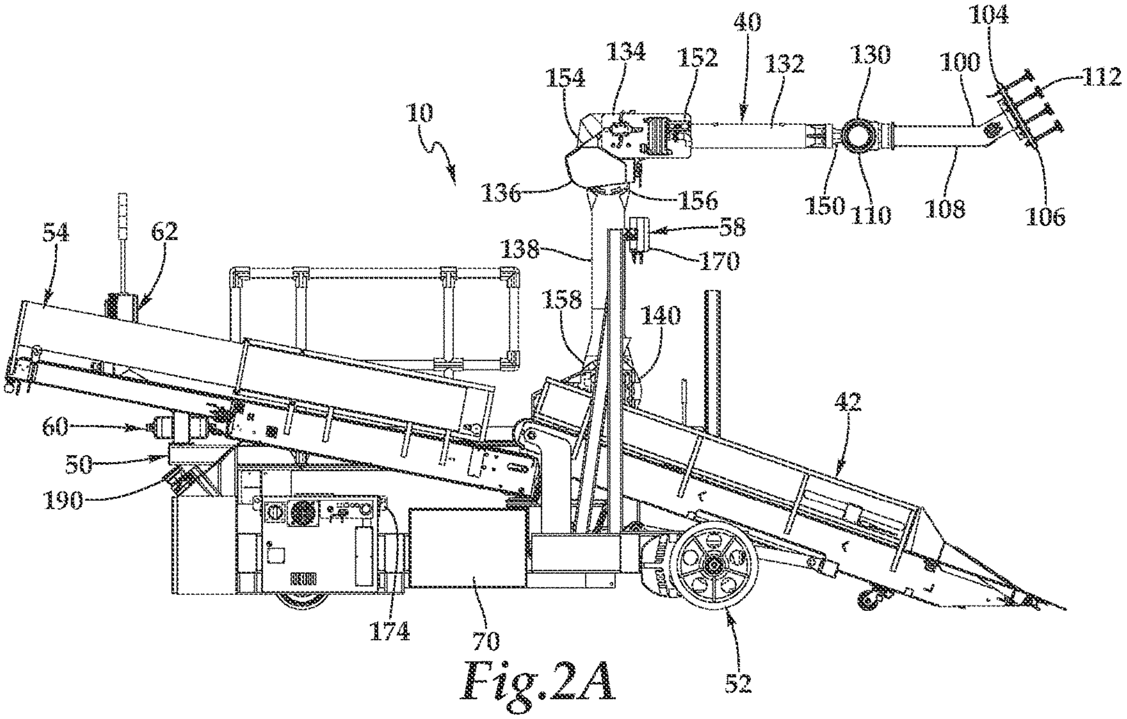
FIG. 2A is a right side elevation view of the automatic truck unloader illustrated in FIG. 1A through FIG. 1D.
Figure 2B:
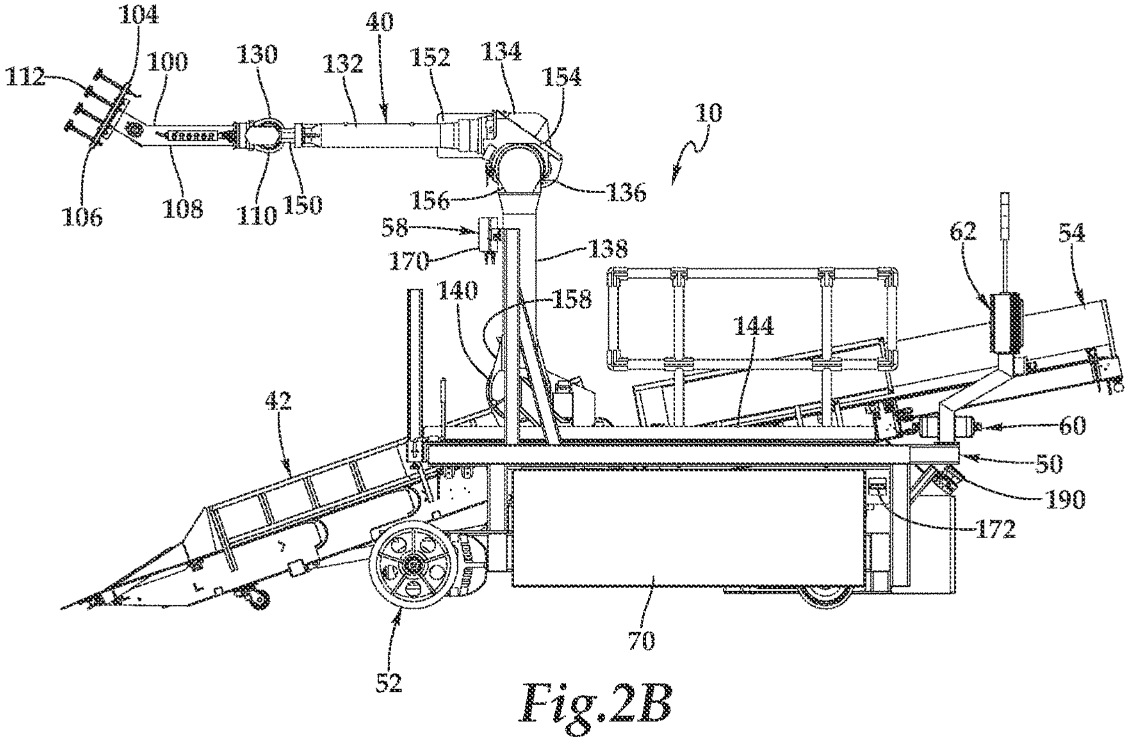
FIG. 2B is a left side elevation view of the automatic truck unloader illustrated in FIG. 1A through FIG. 1D.
Figure 2C:
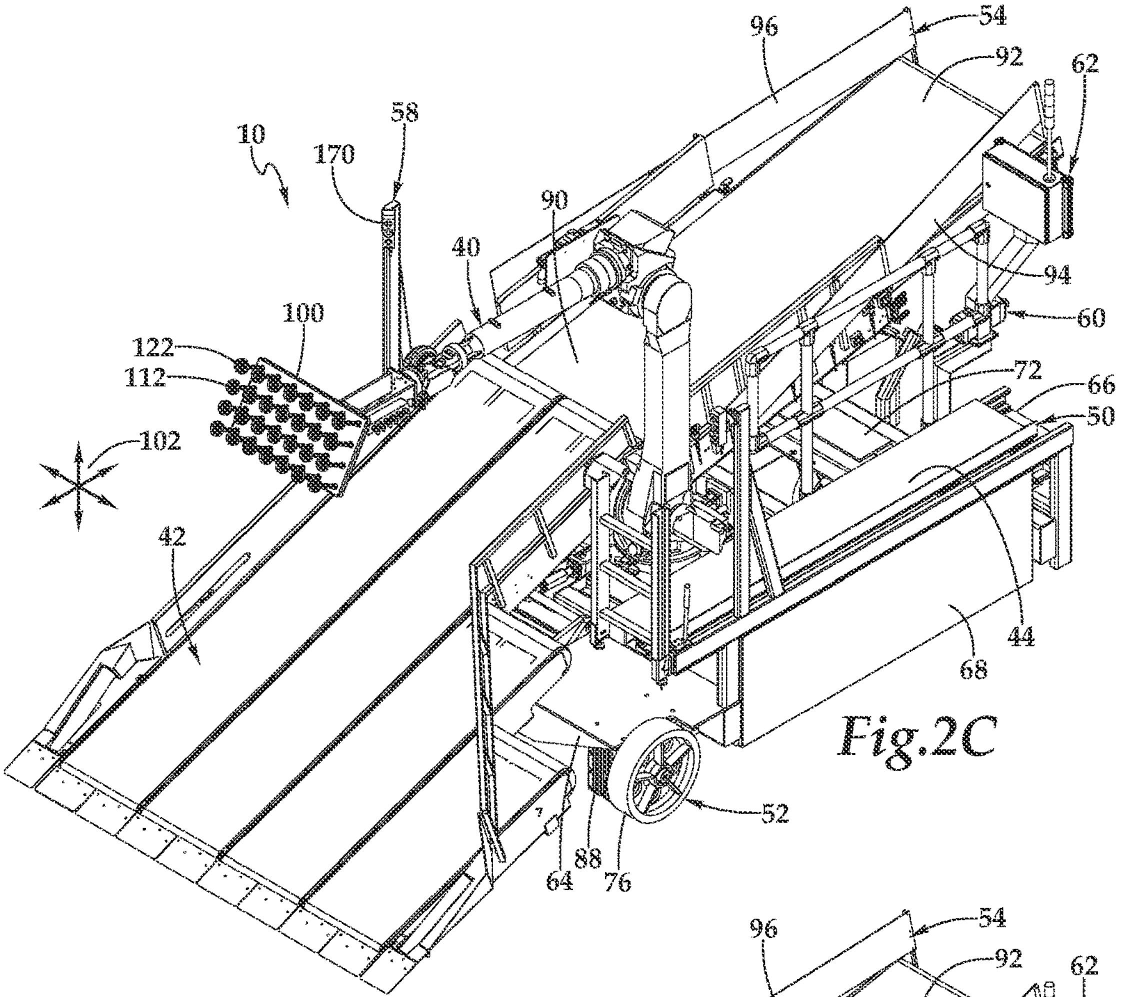
FIG. 2C is a front perspective view of the automatic truck unloader illustrated in FIG. 1A through FIG. 1D, wherein a pivoting front conveyor is articulated in a first position, which may be a low position or the lowest position, for example.
Figure 2D:
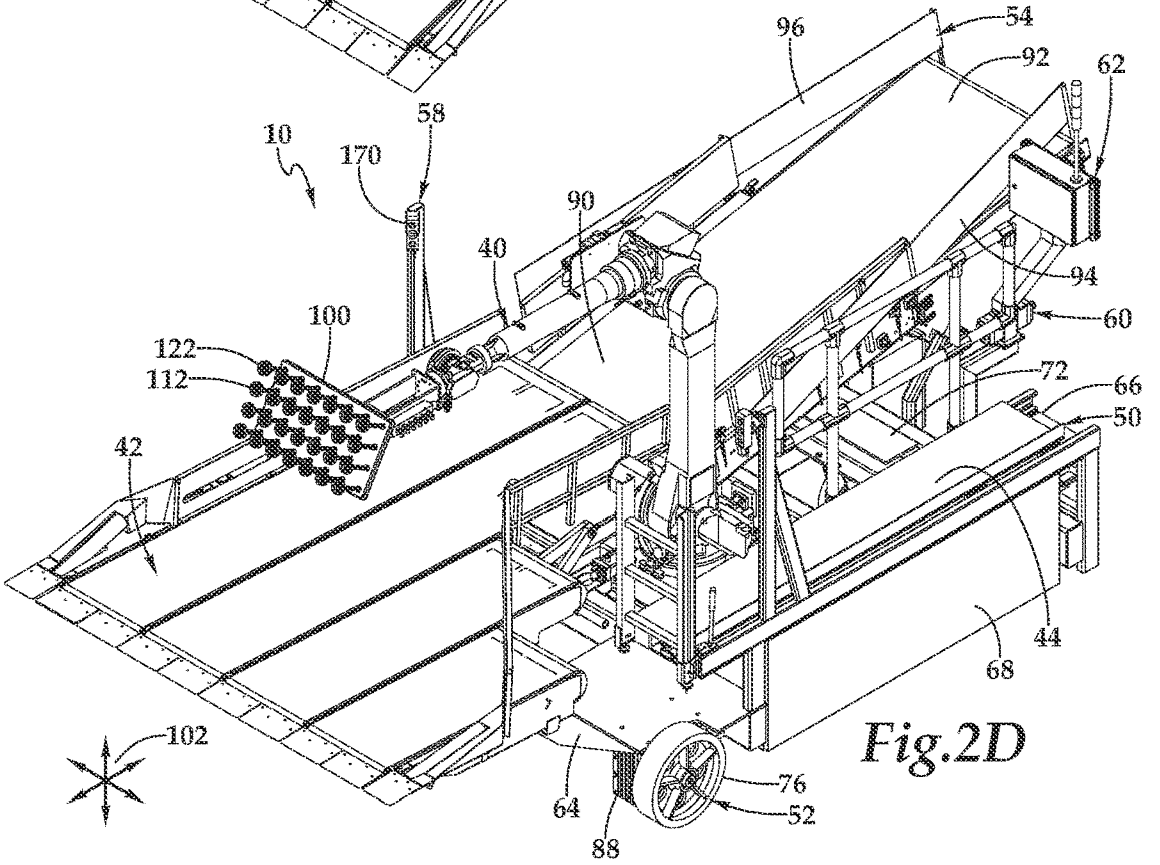
FIG. 2D is a front perspective view of the automatic truck unloader illustrated in FIG. 1A through FIG. 1D, wherein a pivoting front conveyor is articulated in a second position.
Figure 2E:
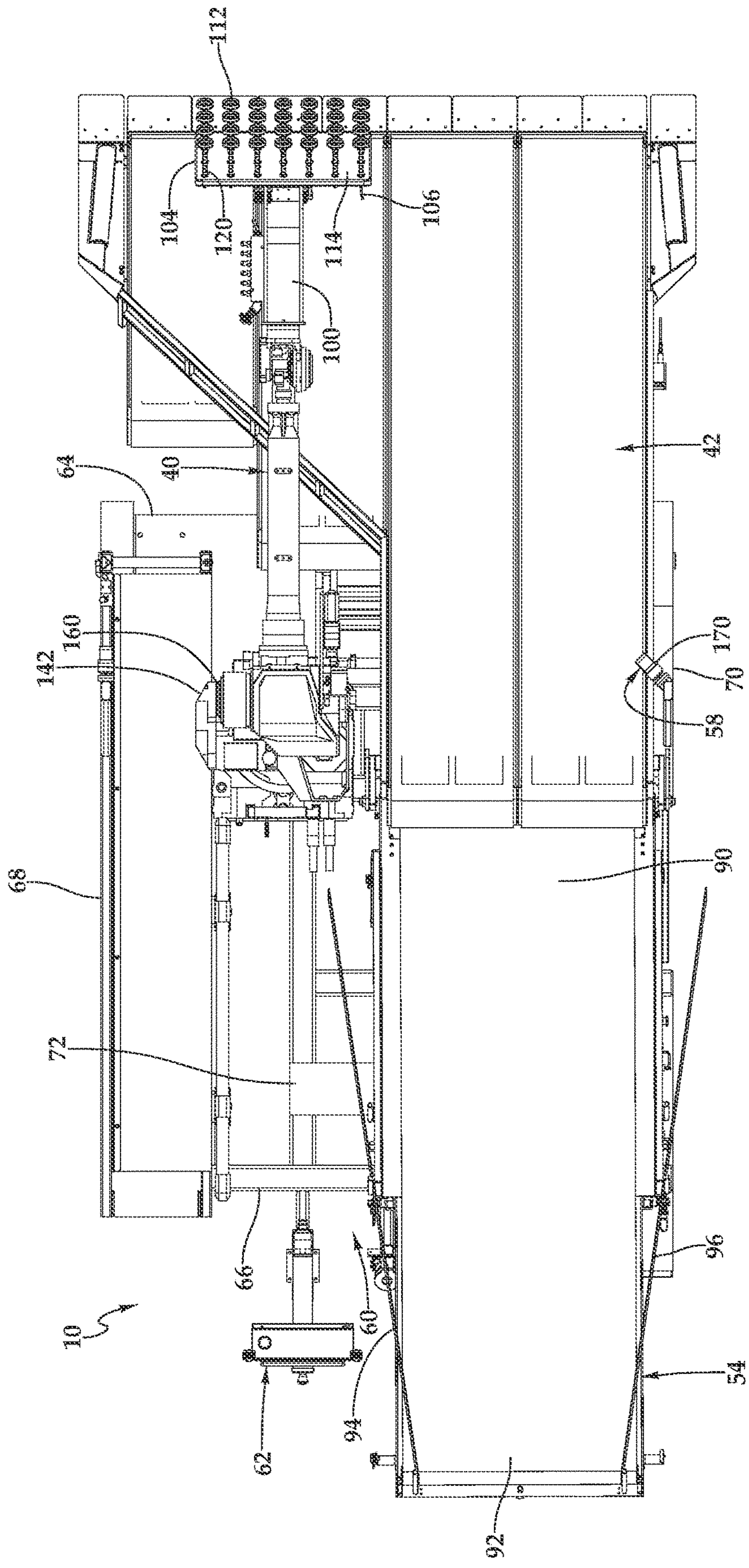
FIG. 2E is a top plan view of the automatic truck unloader illustrated in FIG. 1A through FIG. 1D.
Figure 2F:
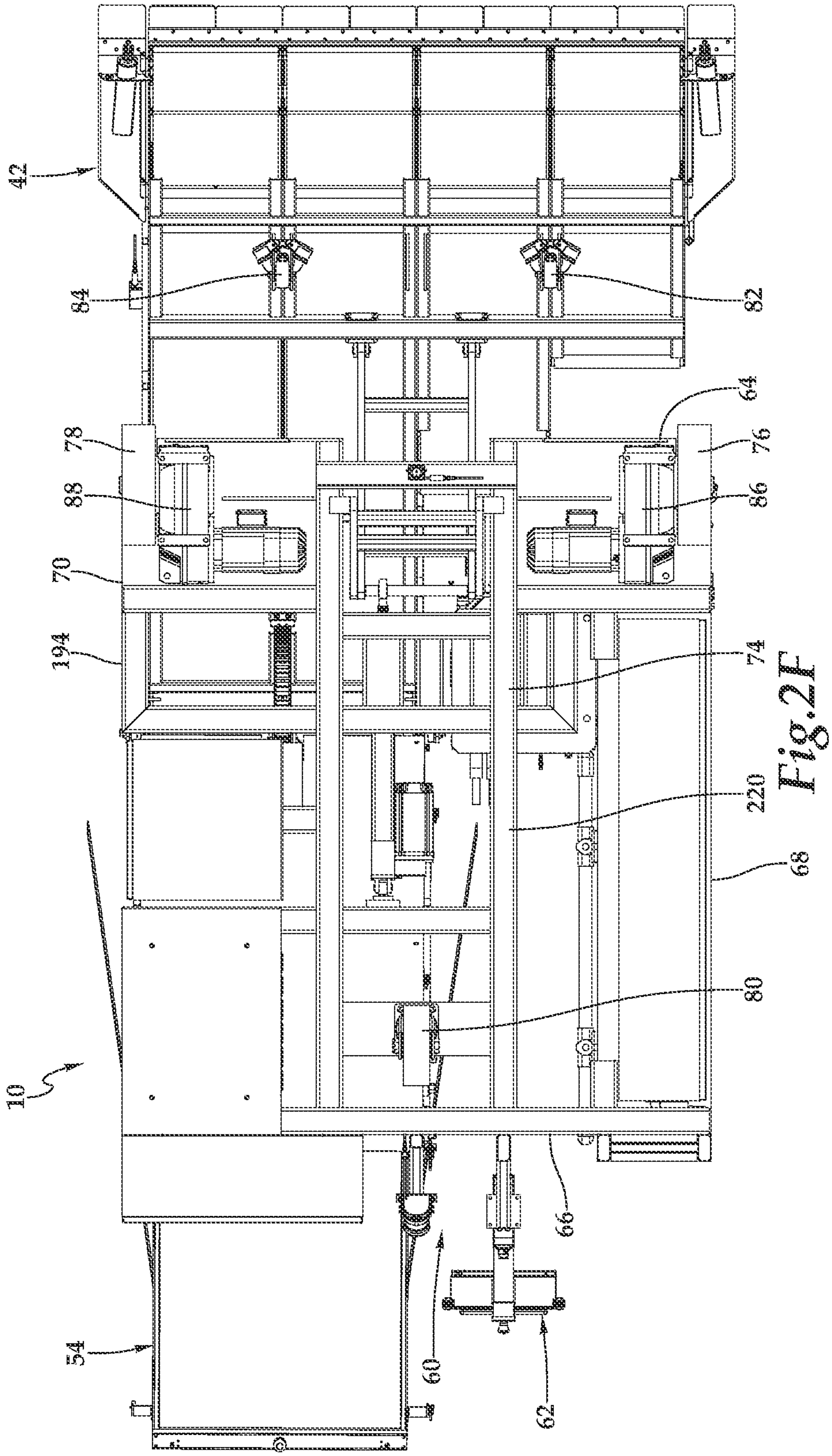
FIG. 2F is a bottom plan view of the automatic truck unloader illustrated in FIG. 1A through FIG. 1D.
Figure 2G:
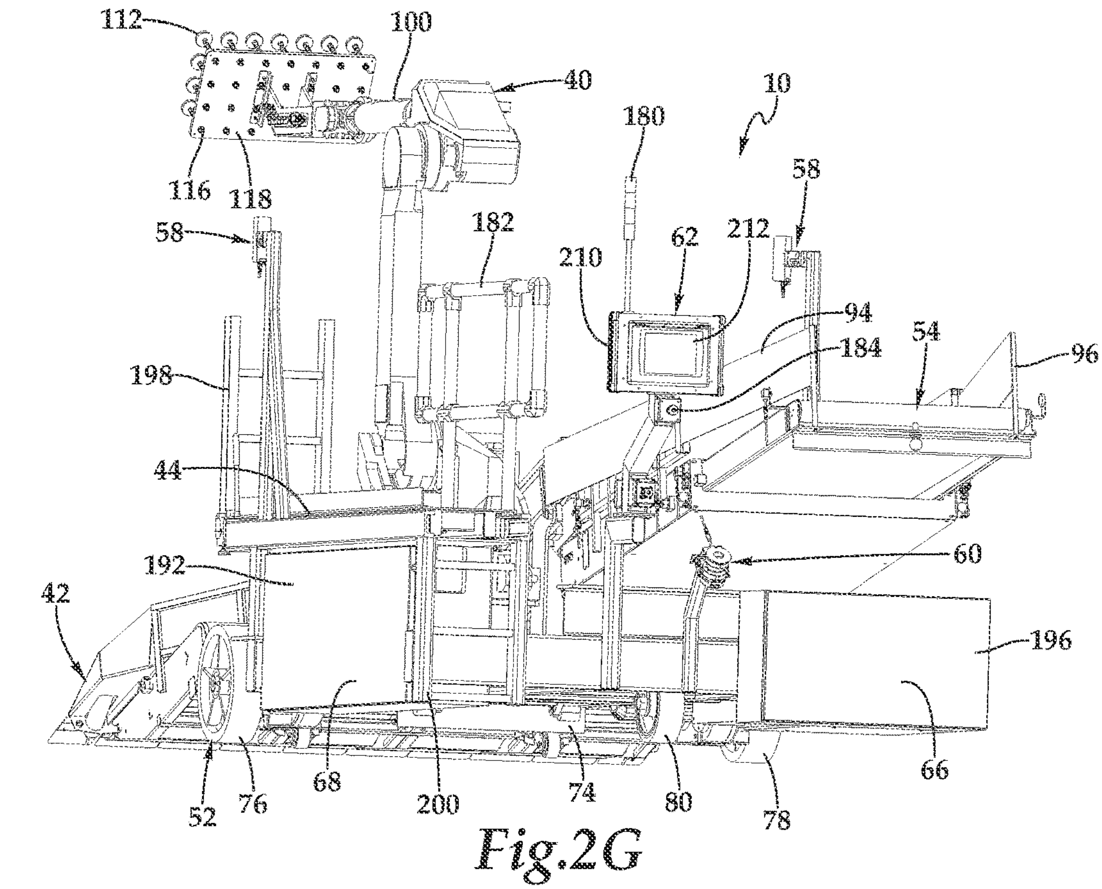
FIG. 2G is a rear perspective view of the automatic truck unloader illustrated in FIG. 1A through FIG. 1D, wherein a pivoting front conveyor is articulated, by way of example, in a low position.
Figure 2H:
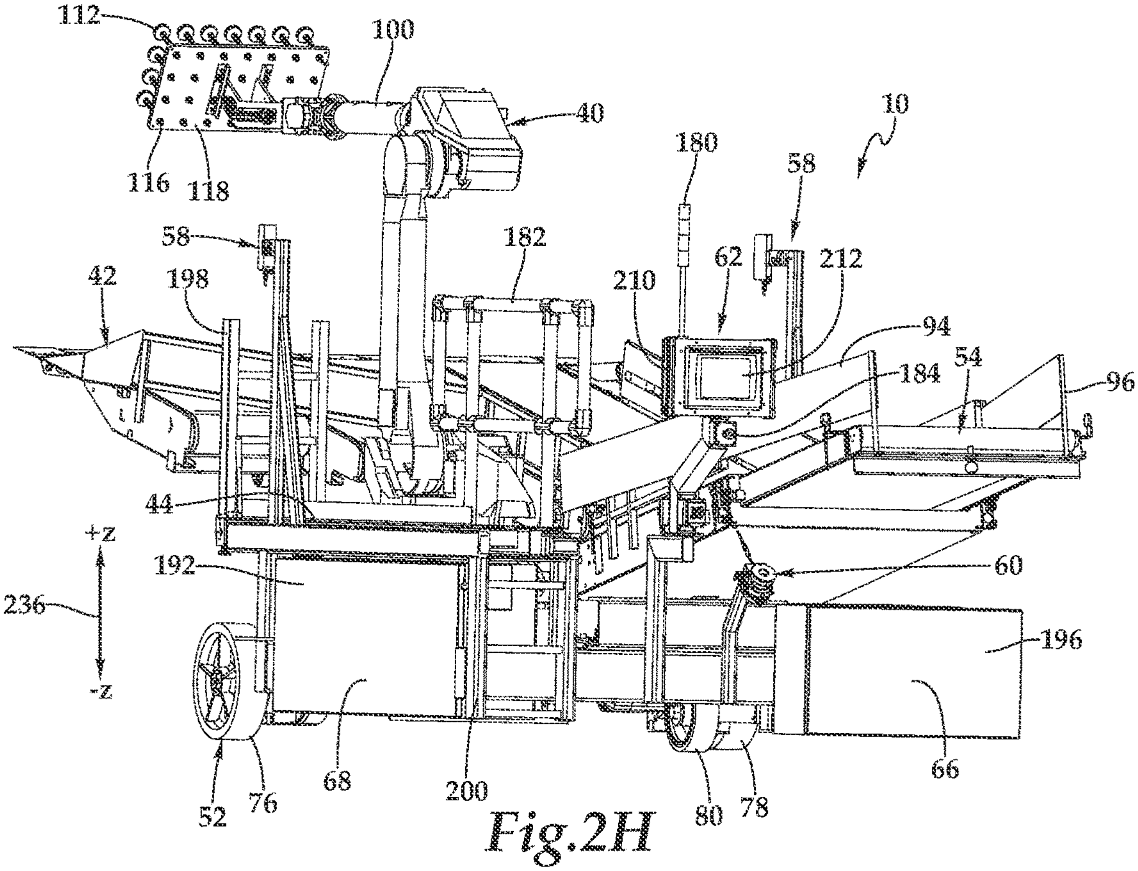
FIG. 2H is a rear perspective view of the automatic truck unloader illustrated in FIG. 1A through FIG. 1D, wherein a pivoting front conveyor is articulated, by way of example, in a high position.
Figure 3A:
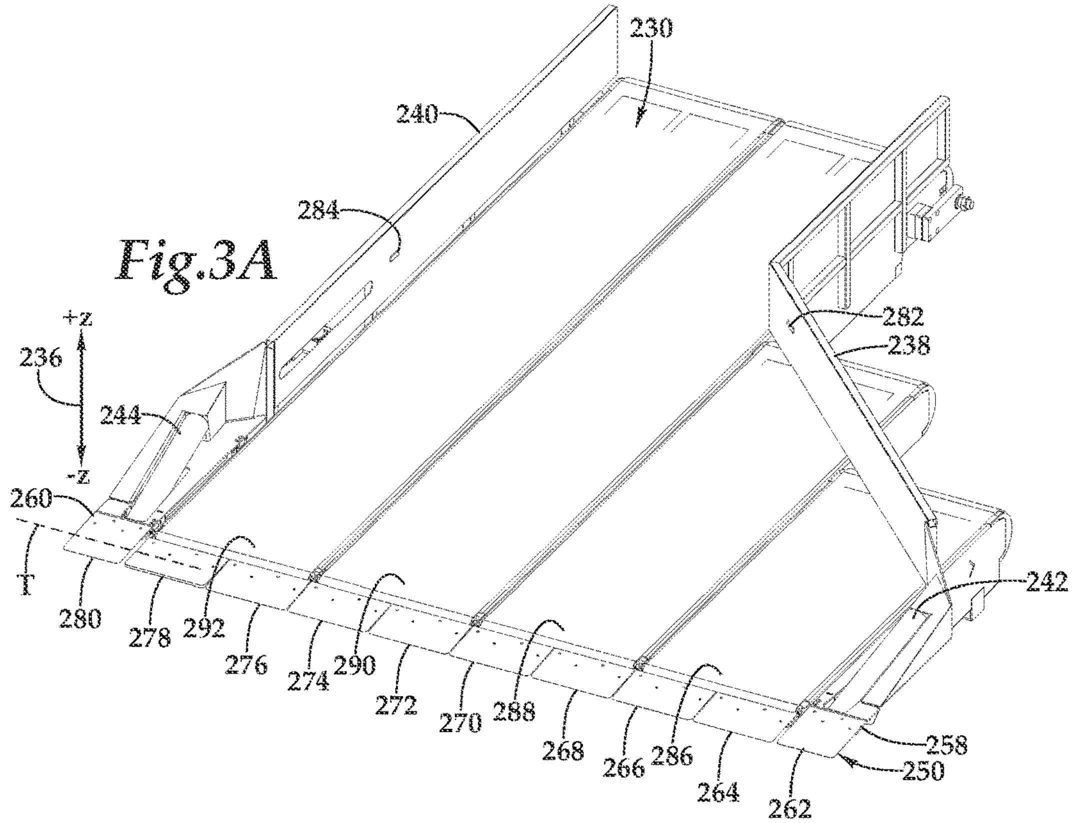
FIG. 3A is a front top perspective view of one embodiment of a pivoting front conveyor, which forms a portion of the automatic truck unloader.
Figure 3B:
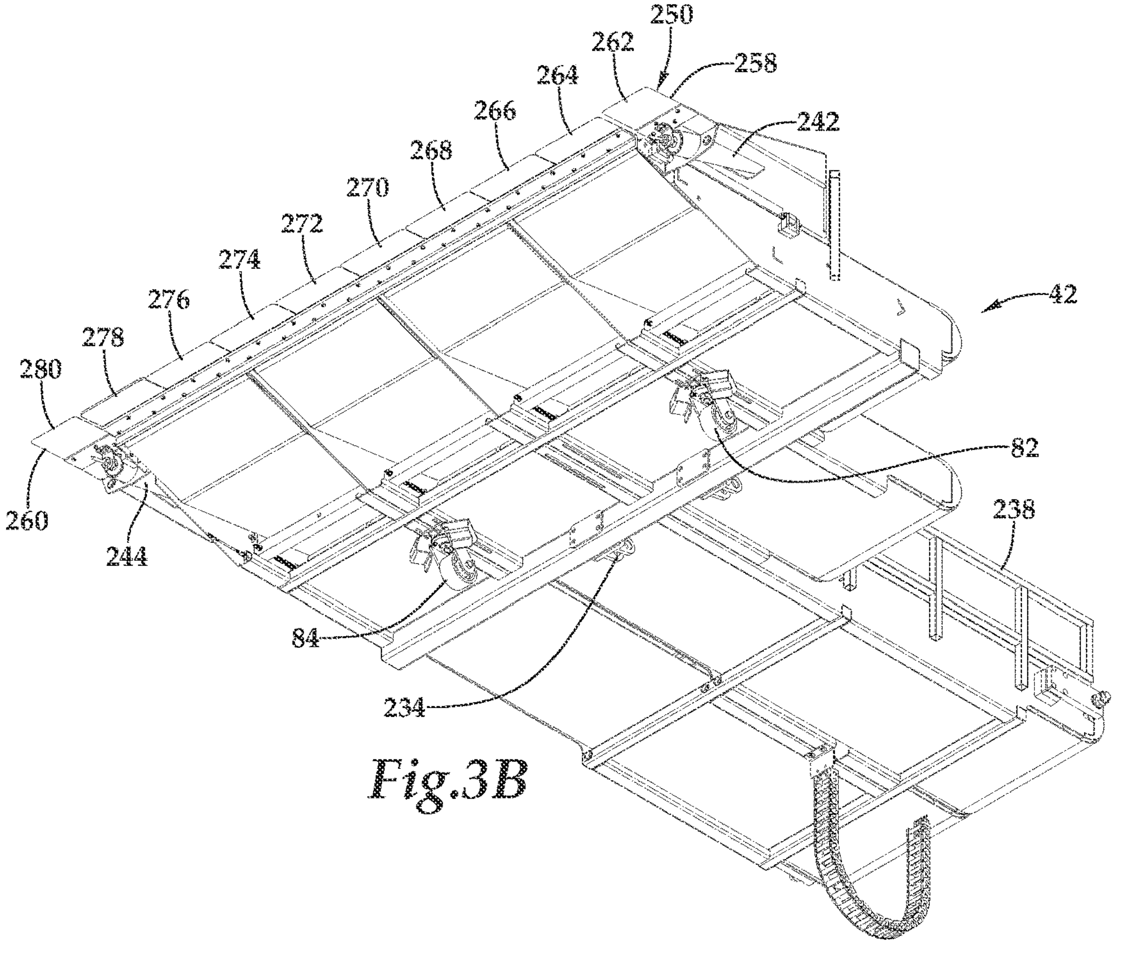
FIG. 3B is a bottom perspective view of the pivoting front conveyor in FIG. 3A.
Figure 4:
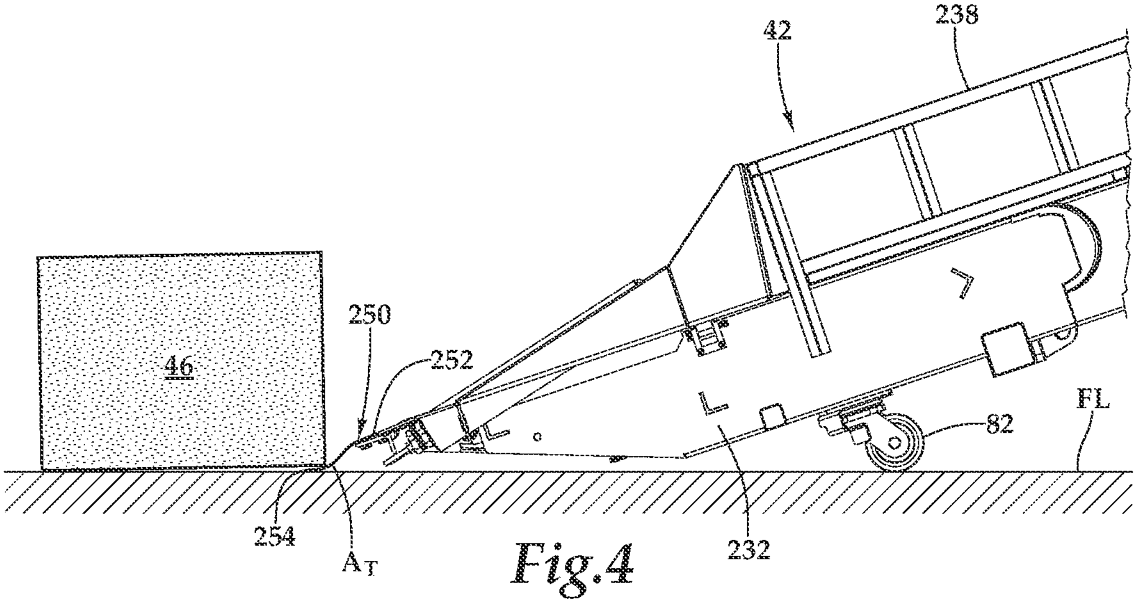
FIG. 4 is a side elevation view of a portion of the pivoting front conveyor depicted in FIG. 3A and FIG. 3B in a first operational embodiment.
Figure 5:
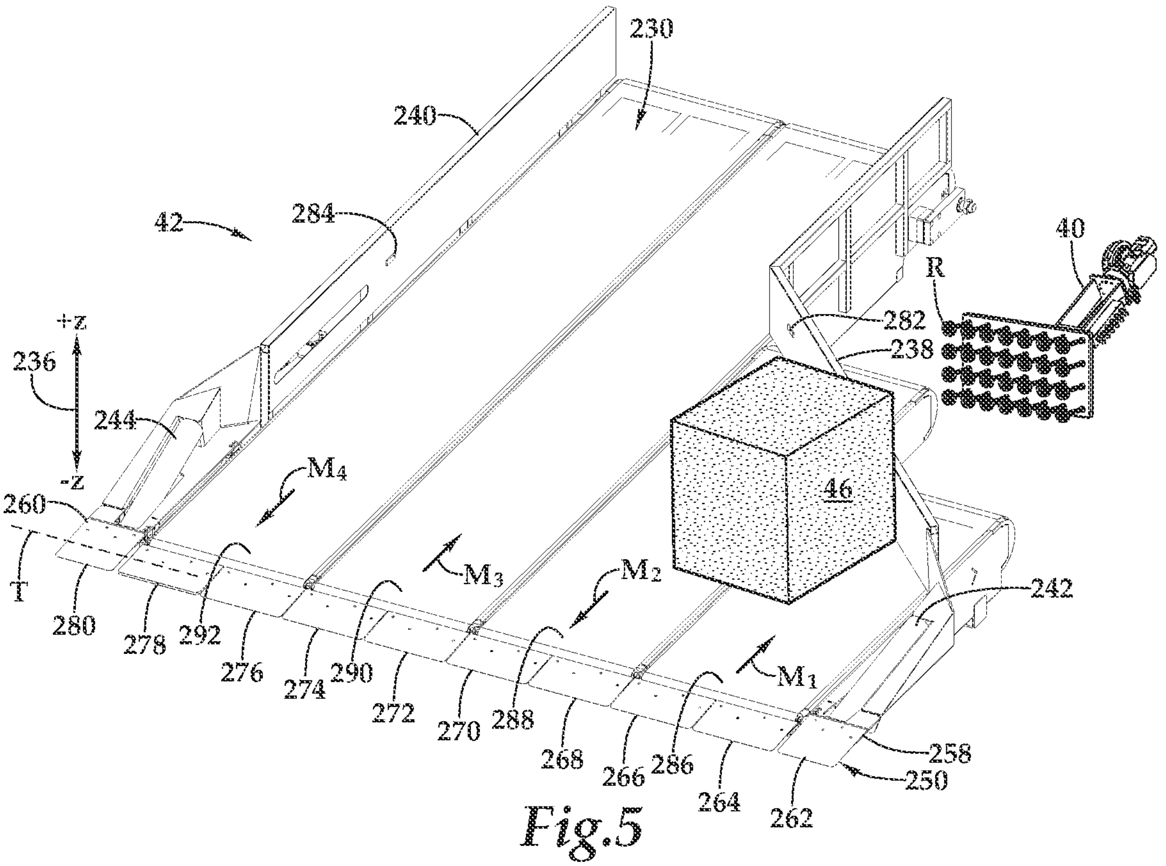
FIG. 5 is a front perspective view of the pivoting front conveyor depicted in FIG. 3A and FIG. 3B in a second operational embodiment.

In one implementation, the industrial robot 40 includes seven segments 130, 132, 134, 136, 138, 140, 142 joined by six joints 150, 152, 154, 156, 158, 160 to furnish selective articulated movement having six degrees of freedom. More particularly, the referenced reachable space 102, as best seen in FIGS. 2C and 2D, is defined by the movement of the industrial robot 40 which provides rotation about six axes including rotary movement of the entire industrial robot 40 about a primary vertical axis; rotary movement of segment 160 having a tower structure about horizontal axis to provide extension and retraction of the segment 132, for example, having a boom arm; rotary movement of the boom arm about the horizontal axis to provide raising and lowering of the boom arm; and selective rotary movement about three wrist axes.

A distance measurement subassembly 170 disposed at the front end 64 of the mobile base 50 measures distances and determines the presence of objects within a detection space which is located in front of the front end 64 and besides the machine. In one embodiment, the detection space and the reachable space 132 at least partially overlap. The distance measurement subassembly 170 assists the robotic truck unloader 10 with forward, reverse, and transverse movement to, by way of example, and not by way of limitation, create space for the industrial robot 40 to operate and to raise and lower the pivoting front conveyor 42. Further, the distance measurement subassembly 170 assists with the coordination and operation of the industrial robot 40 and the pivoting front conveyor 42. Distance and measurement information gathered by the distance measurement subassembly 170 is provided to the control subassembly 62.

The distance measurement subassembly 170 may be a laser range finding apparatus operating on a time-of-flight measurement basis or principle or a camera or a camera system operating on an adaptive depth principle. It should be appreciated, however, that other types of distance measurements are within the teachings of the present invention. By way of example, and not by way of limitation, the distance measurement subassembly 170 may include navigation-based functionality and perception-based functionality. More specifically, the distance measurement subassembly 170 may include a laser range finding apparatuses, cameras, ultrasonic measurement apparatuses, inclinometers, and combinations thereof. It should be appreciated that the location and number of elements in the distance measurement subassembly 170 may vary and is not limited. By way of example and not by way of limitation, similar to distance measurement subassembly 170, distance measurement subassemblies 172, 174 may also be provided that are respectively disposed at the sides 68, 70 or other location. The distance measurement subassemblies 172, 174 each may include in one embodiment, detection spaces (not illustrated) to provide measurement and distance information to the control subassembly 62 during traverse movement operations of the robotic truck unloader 10.

The safety subsystem 60 is distributed and mounted to the mobile base 50. The safety subsystem 60 may include a light tower 180 which provides a quick indication of the current status of the robotic truck unloader 10 to an operator and a wireless operator alert system which contacts smart devices of individuals through a wireless network. Also railing 182 may be included around the operator platform 44 to provide additional safety to the operator. Emergency buttons, such as emergency stop button 184, may be located throughout the robotic truck unloader 10 to provide for instant and immediate power down. Rear safety scanners 190 may be used to protect the robotic truck unloader 10, people, and product during a collision with an obstacle. A power panel 192 and a user interface 194 are appropriately positioned to not interfere with safe operation of the robotic truck unloader 10. It should be appreciated that other safety features may be integrated into the robotic truck unloader 10. By way of example and not by way of limitation, some embodiments may include lateral safety bumpers and a rear safety bumper having detectors that detect the presence of an object and cause an automatic power down during a collision. By way of further example, deployable or fixed safety ladders 198, 200 may be positioned at either end of the operator platform 44, if necessary to particular designs and applications of the robotic truck unloader 10.

The control subassembly 62, which is also distributed and mounted to the mobile base 50, may include a control station 210 having a user interface 212 disposed near the rear end 66 of the operator platform 44. As discussed, the drive subassembly 52, the conveyance subassembly 54, the industrial robot 40, the pivoting front conveyor 42, the positioning subassembly 58, and the safety subassembly 60 are interconnected and in communication with the control subassembly 62 via a network of concealed and sheathed cables and wires. With this arrangement, the control subassembly 62 may coordinate the manual and automatic operation of the robotic truck unloader 10.

A main frame 220 is constructed of welded steel tubing that includes tubular sections which provide a rectangular framework. With reference to the operation of the drive subassembly 52 in conjunction with the mobile base 50, the drive wheel assemblies 76, 78 and the universal wheel assembly 80 provide mobility along the length of the robotic truck unloader 10. In addition to providing forward and reverse capability, in one embodiment, the drive subassembly 52 may furnish a traverse drive system providing the capability to move the entire robotic truck unloader 10 perpendicular to a trailer or fixed object at the loading dock 32 or other location. In some other embodiments, the robotic truck unloader 10 may be secured to a static platform that may transversely move between adjacent dock doors.

Referring now to FIGS. 3A, 3B, 4, and 5, the pivoting front conveyor 42 is disposed at the front end 64 of the mobile base 50. The pivoting front conveyor 42 has a deck conveyor unit 230 integrated therewith in order to handle and transport the product 46 to the conveyance subassembly 54. As shown, the pivoting front conveyor includes a frame 232, which may be inflexible, that is fixedly secured to the mobile base 50 with an actuated subassembly 234 for each of pivoting, extension, and retraction relative to the robotic truck unloader 10 as shown by the deck reachable space 236. By way of example, the actuated subassembly 234 may include hydraulic subassemblies or servo driven linear actuator subassemblies having mechanical linkages. Lateral skirt plates 238, 240 guide the product 46 onto and through the deck conveyor unit 230. In one implementation, the lateral skirt plates 238, 240 may be at least partially independently deployable about the pivoting front conveyor to contact the ground to improve catching and scooping operations. Lateral rollers 242, 244 assist with the intake and guidance of the product 46 as well.

In one embodiment, the pivoting front conveyor 42 includes a planar, elongated blade 250 exhibiting a rear portion 252 connected to the frame 232. A front portion 254 extends a length from the rear portion 252 along a transverse axis $A_T$ between lateral sides 258, 260. The planar, elongated blade 250 may comprise spring steel or ultra-high-molecular-weight polyethylene, for example. The planar, elongated blade 250 may comprise a flexible material providing abrasion, impact, and chemical resistance. The planar, elongated blade 250 may have a spatula form to fit between the product 46 and a floor FL or a palette knife form to fit between the product 46 and the floor FL.

In some embodiments, the planar elongated blade 250 includes multiple blade segments, such as blade segments 262, 264, 266, 268, 270, 272, 274, 276, 278, 280. It should be appreciated, however, that the number of blade segments, if any are required, may vary depending on the application. Additionally, in one embodiment, the planar elongated blade 250 or its blade segments 262-280 may be removed and replaced. As best seen in FIG. 3C, the planar, elongated blade 250, in response to applied pressure, flexes about the transverse axis $A_T$ to comply with a shape of an object, such as the floor FL, applying the pressure thereat.

In one embodiment, the pivoting front conveyor 42 has sensors 282, 284 that identify a product in-handling located on the pivoting front conveyor 42 for a prolonged period of time. It should be appreciated that in other embodiments, the sensors that detect a product-in-handling are partially or fully integrated into positioning subassembly 58 or the distance measurement subassembly 170, for example. Such a product-in-handling may be stuck and unable to advance from the deck conveyor unit 230 to the conveyance subassembly 54. An automatic error handling operation occurs to release the product-in-handling by agitation of the pivoting front conveyor 42 beneath the product in-handling, or the industrial robot 40 handling the product in-handling on the pivoting front conveyor 42, or a combination thereof. The agitation may include, for example, alternating the movement of the deck conveyor unit 230, or moving the pivoting front conveyor 42 up and down, or a combination thereof. In the embodiment illustrated in FIG. 5, the conveyor units 286-292 are alternated forward and reverse as shown by arrows $M_1$, $M_2$, $M_3$, $M_4$.

Figure 6:
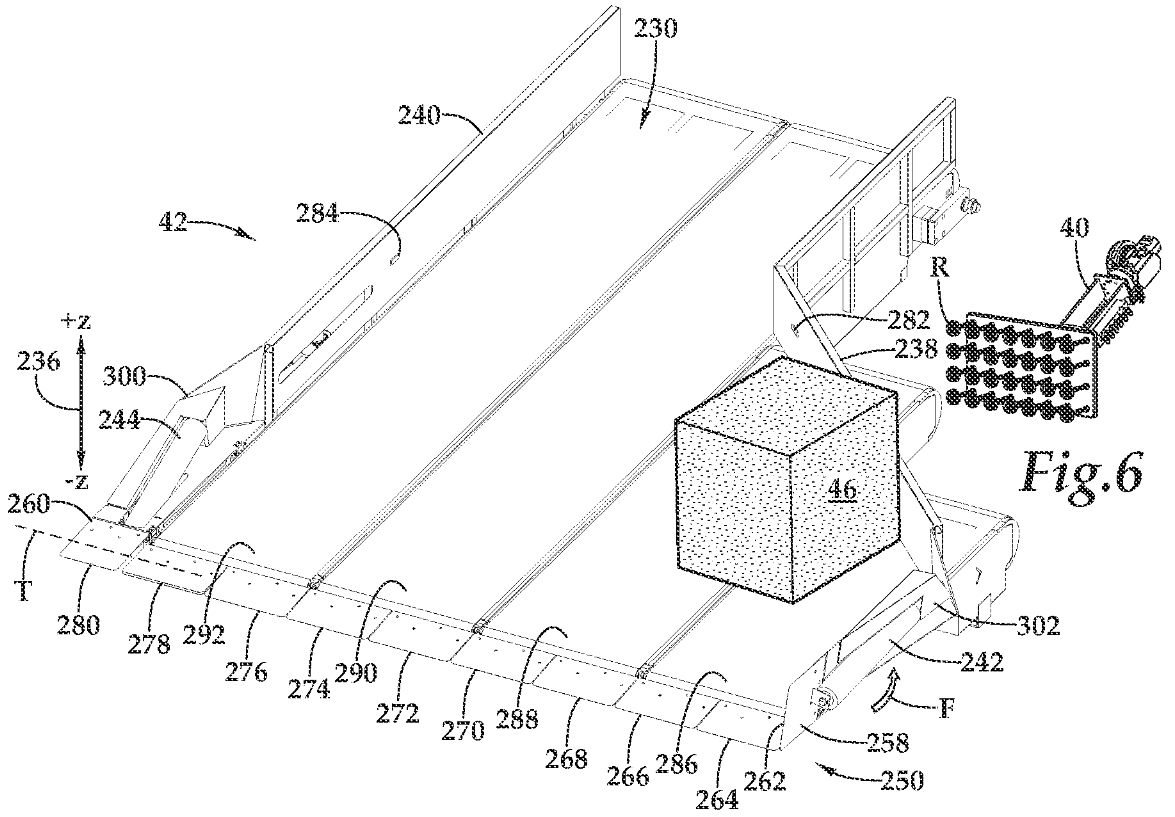
FIG. 6 is a front perspective view of the pivoting front conveyor depicted in FIG. 3A and FIG. 3B in an alternative operational embodiment.

FIG. 6 depicts a further embodiment of an automatic error handling operation whereby product-in-handling is addressed that may be stuck and unable to advance from the deck conveyor unit 230 to the conveyance subassembly 54. As shown, wings 300, 302 positioned laterally on the pivoting front conveyor 42 are able to flip as shown by arrow F. When product, such as the product 46, is stuck, then a wing, such as wing 302, may be activated to handle the product 46 and cause the product 46 to continue conveyance on the pivoting front conveyor 42. Further, in many instances, the entrance to a trailer may be narrower than an interior of the trailer. In these instances, the wings 300, 302 may be flipped inward and upward when the robotic truck unloader 10 enters or exits the trailer. Within the trailer, the wings 300, 302 may be deployed to improve the reach of the pivoting front conveyor 42.

Figure 7:
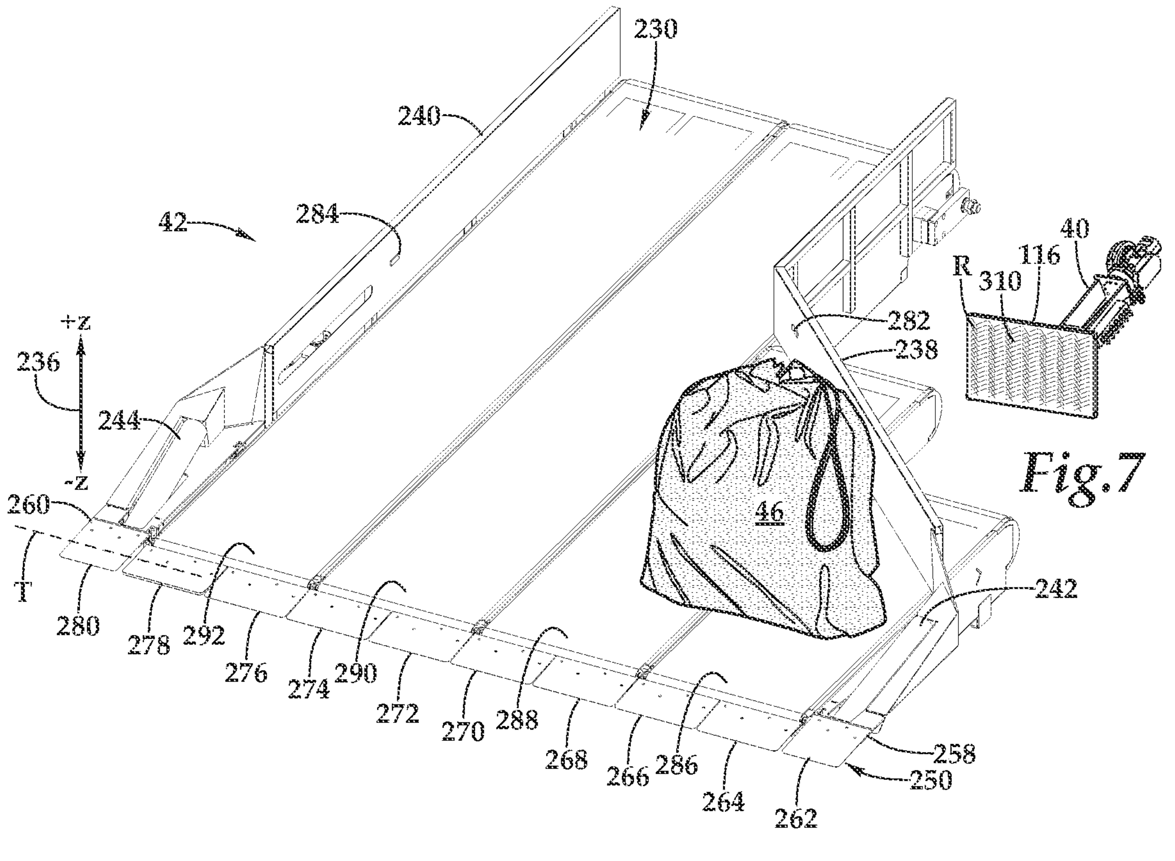
FIG. 7 is a front perspective view of the pivoting front conveyor depicted in FIG. 3A and FIG. 3B in a further alternative operational embodiment.

Referring now to FIG. 7, a still further embodiment of an automatic error handling operation is illustrated, whereby product-in-handling is addressed that may be stuck and unable to advance from the deck conveyor unit 230 to the conveyance subassembly 54. In this embodiment, the industrial robot 40 handling the product in-handling may be utilized to contact the product 46 and clear the error. As previously mentioned, different end effectors 100 may be utilized. As shown, multiple pins 310 are associated with the face 114 of the grappler plate 106 in order to handle product when the product is a bag, such as the product shown in FIG. 7.

Figure 8:
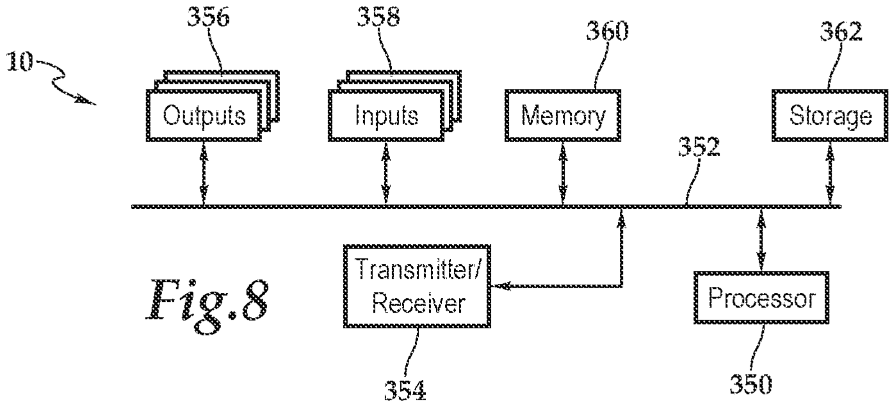
FIG. 8 is a functional block diagram of one embodiment of the robotic truck unloader.

FIG. 8 depicts one embodiment of the robotic truck unloader 10 in which the robotic truck unloader 10 is schematically depicted to include a computer-based architecture including a processor 350 coupled to a bus 352 having transmitter/receiver circuitry 354, outputs 356, inputs 358, memory 360, and storage 362 interconnected therewith. In one embodiment, the control subassembly 62 includes the memory 360, which is accessible to the processor 350. Further, the control subassembly 62 may encompass and include a perception subsystem, which in some embodiments, provides the software that analyzes raw data to provide meaningful information to the rest of the robotic truck unloader 10. The memory 360 includes processor-executable instructions that, when executed cause the processor 350 to execute instructions for unpacking or unloading product 46, such as parcels or other objects.

By way of example and not by way of limitation, the memory may include first processor-executable instructions that specify the removal of product utilizing the industrial robot and/or the pivoting front conveyor. The processor-executable instructions cause the processor to construct a model from multiple data images collected by the distance measurement subassembly 170, which may include one or more sensors or cameras. The model is a representation of a physical environment of at least one of the industrial robot and pivoting front conveyor. The physical environment includes the product. The processor-executable instructions cause the processor to specify a search operation within the model to identify a foreground wall and then specify a search operation within the foreground wall to identify a candidate product contact face belonging to at least one candidate product of the plurality of product. This may result in proceeding to execute a pick operation or move the robotic truck unloader 10 for repositioning based on location of the foreground wall of product W.

The processor-executable instructions may then cause the processor to specify a removal operation to unload the plurality of product with at least one of the industrial robots and the pivoting front conveyor. In one implementation, these processor-executable instructions may cause the processor to specify a removal operation to pick the product, which may include multiple parcels, with the industrial robot at the candidate product contact face. The parcels are then caught by the pivoting front conveyor. In another implementation, these processor-executable instructions may specify multiple scoop removal operations with the pivoting front conveyor, such as specifying a deep scoop removal operation and a shallow scoop removal operation. The scoop removal operations may be specified to occur at an evacuated front area, which is subjacent to the candidate product contact face.

A search operation is then specified to identify a product in-handling located on the pivoting front conveyor, and in response to the product in-handling located on the pivoting front conveyor, an automatic error handling operation is specified. The automatic error handling operation may include an agitation of the pivoting front conveyor beneath the product in-handling or the industrial robot handling the product in-handling on the pivoting front conveyor, for example.

By way of example and not by way of limitation, the memory may include second processor-executable instructions, which are directed to construct a 3-D model from a plurality of first data images collected by the camera. The 3-D model is a representation of a physical environment, which includes the product, of the industrial robot and the pivoting front conveyor. The instructions also cause the process to transform multiple 3-D data images captured by the distance measurement subassembly 170 into a partial 3-D model that is subjected to filtering to provide a filtered 3-D model. A search operation may then be specified within the 3-D model to identify a foreground wall, which belongs to the product. Following this search operation, the processor-executable instructions may specify another search operation to identify a candidate product contact face at the foreground wall, which may belong to a candidate product or candidate products of the product. With respect to the candidate product contact face, more specifically, the instructions cause the processor to identify segmented planes within the 3-D voxel model using plane segmentation utilizing a weighted surface area, which, in one embodiment or prioritization, may result in a T-shaped candidate product face that is located offset and beneath the top of the foreground wall. In one embodiment, the candidate product contact face intersects multiple candidate product parcels. Further instructions that are executed include a removal operation to unload the candidate products and calculate instructions for removing the candidate products for pick-and-scoop operations using the industrial robot and the pivoting front conveyor.

By utilizing these various instructions the robotic truck unloader may specify a first removal operation to remove a first portion of the product within an upper portion of the foreground wall W with the industrial robot such that the product is grasped and pulled by the industrial robot and caught by the pivoting front conveyor. Once caught by the pivoting front conveyor, downstream conveyance may begin. The robotic truck unloader may also specify, following the first removal operation, a second removal operation to scoop a second portion of the product within the lower portion with the pivoting front conveyor. Such operations utilizing the navigation and perception capabilities of the robotic truck unloader may continue until all the product is removed. Additionally, if and when needed, error handling operations are executed.

Figure 9:
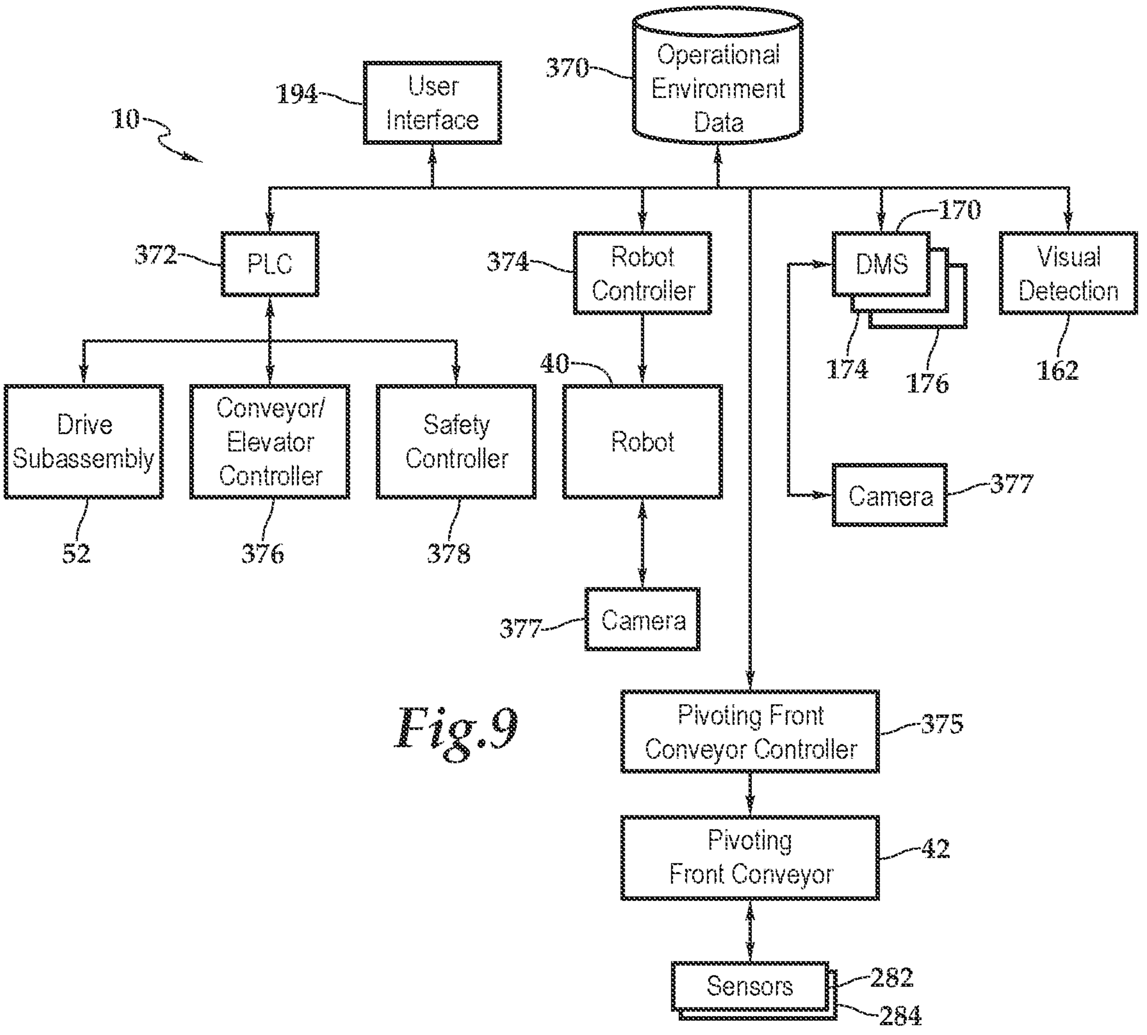
FIG. 9 is a functional block diagram of one embodiment of the robotic truck unloader in additional detail.

FIG. 9 depicts one embodiment of the robotic truck unloader 10 and the control signals associated therewith, which may be deployed across the computer architecture shown in FIG. 8, for example. The illustrated components coordinate the various functions and operations of the robotic truck unloader 10. The user interface 194, operational environment database 370, programmable logic controller 372, robot controller 374, pivoting front conveyor controller 375, and distance measurement subassemblies 170, 172, 174, depending on the number being employed, are interconnected. As shown, a camera 377 may be associated with the distance measurement subassembly 170 and have a variable positioning. That is, the location of the distance measurement subassembly 170 may vary and components thereof, such as the camera, may be placed at different locations on the robotic truck unloader 10, including the industrial robot 40, for example. The drive subassembly 52, the conveyance subassembly 54, as represented by control 376 for conveyors/elevators, and safety controller 378 are connected to the programmable logic controller 372. Finally, the industrial robot 40 and the pivoting front conveyor 42 are connected to the robot controller 374. In one implementation, the user interface 212, operational environment database 370, and programmable logic controller 372 are part of the control subassembly 62 and the robot controller 374 forms a portion of the industrial robot 40, the pivoting front conveyor 40, or a combination of both. The safety controller 358 is included in the safety subsystem 60 and provides operation to the aforementioned components of this subsystem.

The user interface 212 provides user control and interaction with the robotic truck unloader 10. The user interface 212 may utilize icons in conjunction with labels and/or text to provide navigation and a full representation of the information and actions available to the operator. In addition to loading operations, user interactions may be related to maintenance, repair and other routine actions which keep the robotic truck unloader 10 in working order or prevent trouble from arising.

The operational data environment database 370 includes data about the reachable space 102 of the industrial robot 40, the reachable space 236 of the pivoting front conveyor 42, picking methodology data, grasping methodology data, pulling methodology data, catching methodology data, and scooping methodology data. Product information as well as information about the standard sizes of trailers is not necessary but may be provided. With the systems and methods presented herein related to the robotic truck unloader utilize the navigation and perception-based technology presented herein permit the grasping and pulling of product, such as parcels, without regard to where the individual instances of product are located and without regard to prior knowledge of the environment (e.g., dimensions of the truck).

If stored, the product information may be stored in the operational data environment database 350, gathered by the conveyance subassembly 54 as previously discussed, or gained by a combination thereof. By way of example, Tables I & II present exemplary examples of type of trailer data that the automatic ruck unloader 10 may utilize in determining position and product placement. It should be appreciated, however, that the robotic truck unloader presented herein may operate within pre-loaded information such as the trailer data presented in Tables I & II or operate without this data.

TABLE I

TRAILER DIMENSIONS

| Trailer Type | Length | Inside Width | Inside Height Center | Inside Height Front | Door Opening Width |
|---|---|---|---|---|---|
| 28' (8.5 m) High Cube | 27'3" (8.3 m) | 100" (2.5 m) | 109" (2.8 m) | 107" (2.7 m) | 93" (2.4 m) |
| 45' (13.7 m) Wedge | 44'1½" (13.4 m) | 93" (2.4 m) | 109" (2.8 m) | 106" (2.7 m) | 87" (2 m) |
| 48' (14.6 m) Wedge | 47'3" (14.4 m) | 99" (2.5 m) | 110½" (2.8 m) | 108½" (2.8 m) | 93" (2.4 m) |

TABLE II

TRAILER DIMENSIONS CONTINUED

| Trailer Type | Door Opening Height | Rear Floor Height | Cubic Capacity | Overall Width | Overall Height |
|---|---|---|---|---|---|
| 28' (8.5 m) High Cube | 104" (2.6 m) | 47½" (1.2 m) | 2029 cft (57.5 cm) | 102" (2.6 m) | 13'6" (4.1 m) |
| 45' (13.7 m) Wedge | 105½" (2.7 m) | 50" (1.3 m) | 3083 cft (7.3 cm) | 96" (2.4 m) | 13'6" (4.1 m) |
| 48' (14.6 m) Wedge | 105" (2.7 m) | 48½" (1.2 m) | 3566 cft (101 cm) | 102" (2.6 m) | 13'6" (4.1 m) |

The programmable logic controller 372 coordinates overall operation and switches between various modes of operation including manual and automatic. The programmable logic controller 372 also provides for the high-level calculation and coordination required during automatic operation for various items.

The robot controller 374 controls the motions of the industrial robot 40 and through built in inputs and outputs wired to the industrial robot 40. The programmable logic controller 372 controls the motions of the pivoting front conveyor 42 through built in inputs and outputs wired therewith. It should be appreciated that although a particular architecture is presented for the control of the robotic truck unloader 10, other architectures are within the teachings of the present invention. By way of example, any combination of hardware, software, and firmware may be employed. By way of further example, the distribution of control may differ from that presented herein.

In one operation embodiment, the programmable logic controller 372 accesses the dimensions of the trailer 16 from the operational environment database 372. An operator indicates through the user interface 212 which type of trailer has arrived at the docking bay 30. Alternatively, the distance measurement subassembly 170 is operable to detect this information. The distance measurement subassemblies 170, 172, 174 relay distance and position data to the programmable logic controller 352 which uses this information to send control signals to the robot controller 374, the drive subassembly 52, the controller 372, and the safety controller 378. Additionally, the programmable logic controller 372 receives control signals, which are inputs into the behavior process, from each of these components. Constant updates and status information are provided to the operator by the programmable logic controller 352 through the user interface 194.

Figure 10:
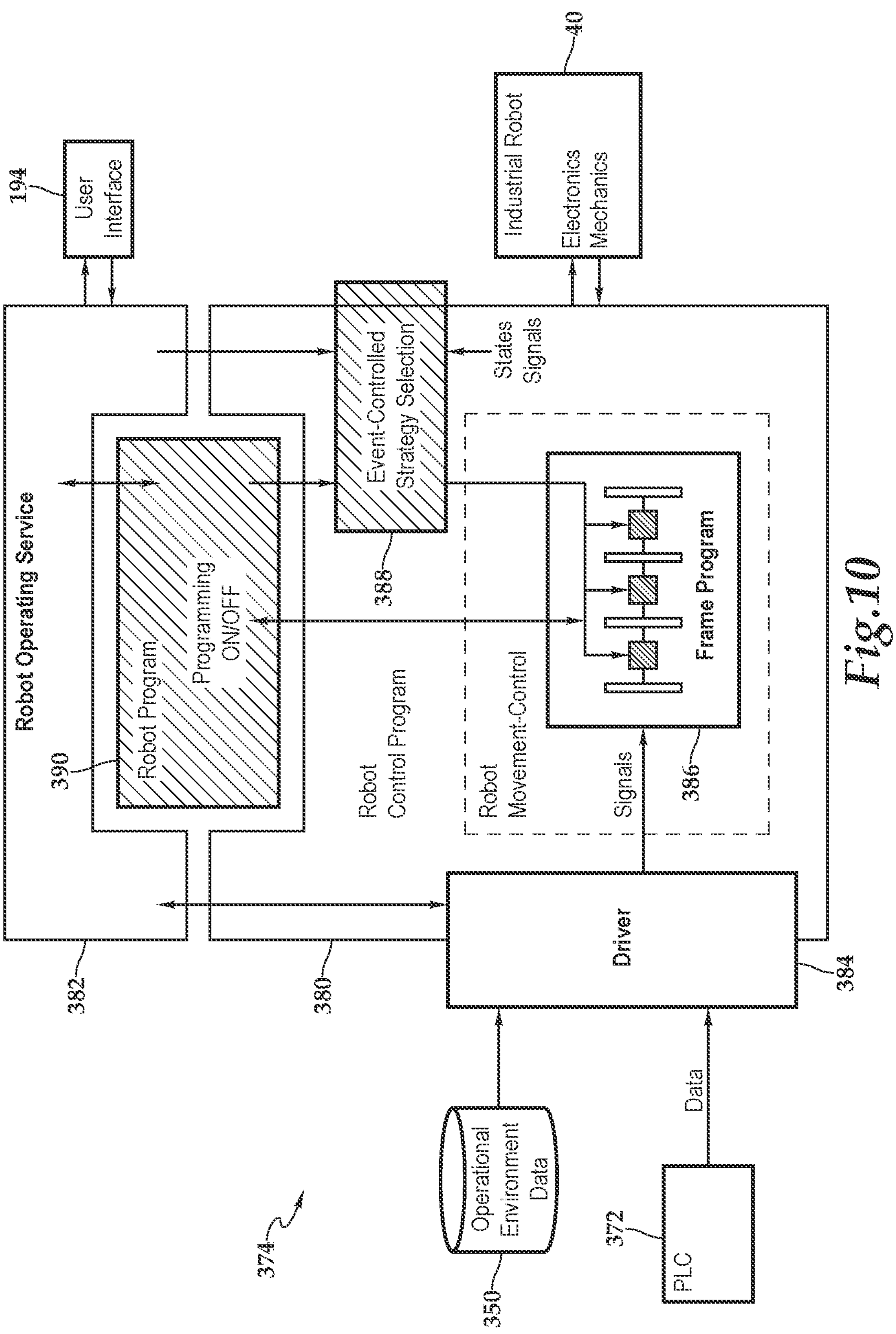
FIG. 10 is a functional block diagram of one embodiment of a robot controller which forms a portion of the robotic truck unloader.

FIG. 10 depicts one embodiment of the robot controller 372 which forms a portion of the robotic truck unloader 10. The essence of the robot control 372 is a robot system or control program 380, which controls the industrial robot 40 and the pivoting front conveyor 42. The control program 380 can be operated by the operator, automatically, by means of an operating service 362 in communication with the user interface 212, which receives input data (as well as provide instructions, as appropriate) from the operational environmental database 370, programmable logic controller 372 by means of a driver 384. It should be appreciated, that the independence of the robot controller 374 may vary. In one implementation, the robot controller 374 may be under the control of the programmable logic controller 374. In another implementation, as illustrated, the robot controller 374 is more autonomous and may include features such as direct connection to the user interface 194.

According to one embodiment, between the driver 384 and the control program 380 is provided an independent data processing layer in the form of a frame program 386, which controls the robot movements, and a unit 388 for automated or event-controlled strategy or behavioral selection on the basis of the states and signals which occur. User application programs, event-controlled strategy selections and sensor programs in the frame program 386 can be programmed by the operator and directed by a robot program 390, which monitors the balance and implementation of manual and automatic control of the industrial robot.

Figure 11:
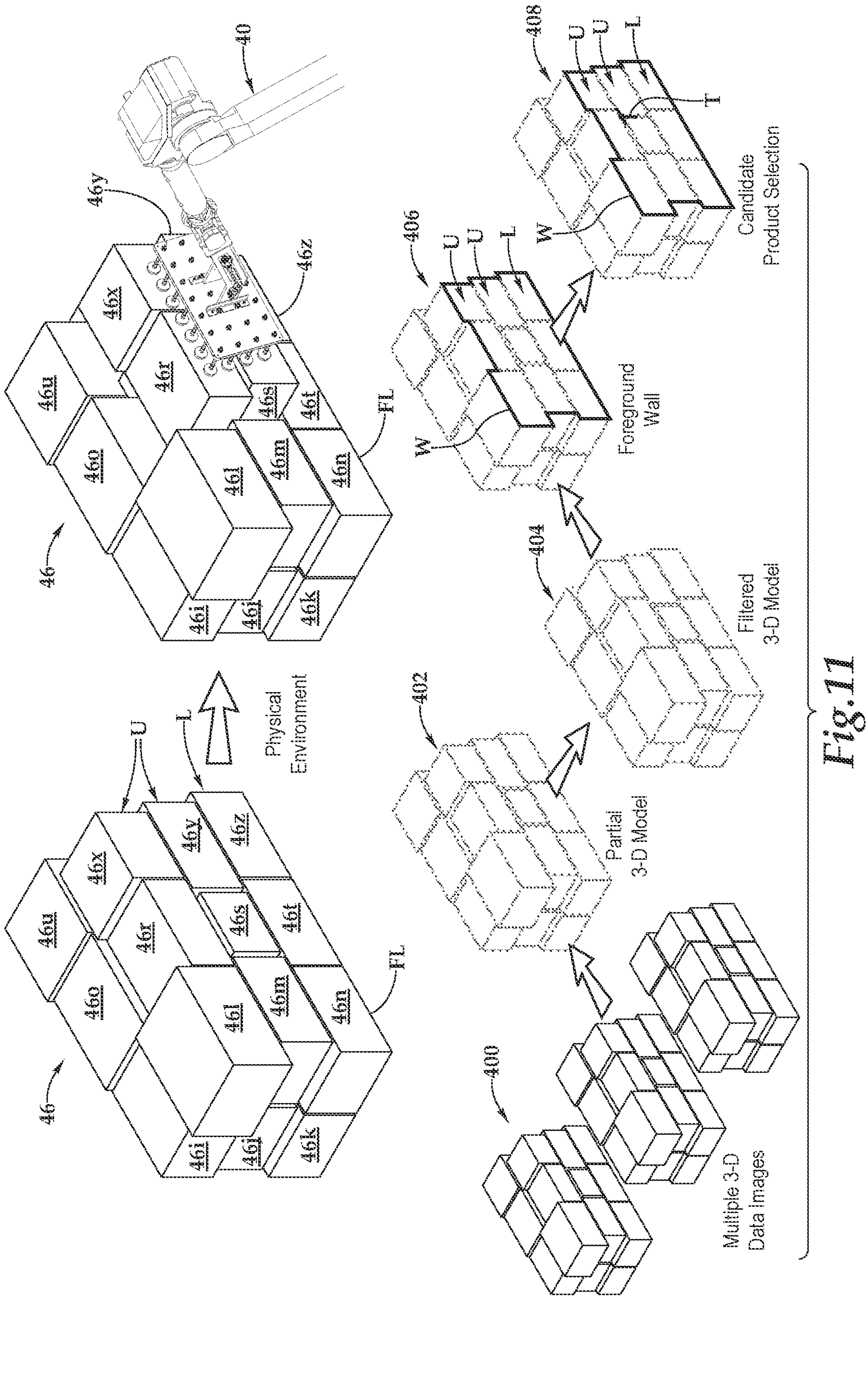
FIG. 11 is a schematic diagram of one embodiment of the perception-based robotic manipulation system in a first operational embodiment.
Figure 14:
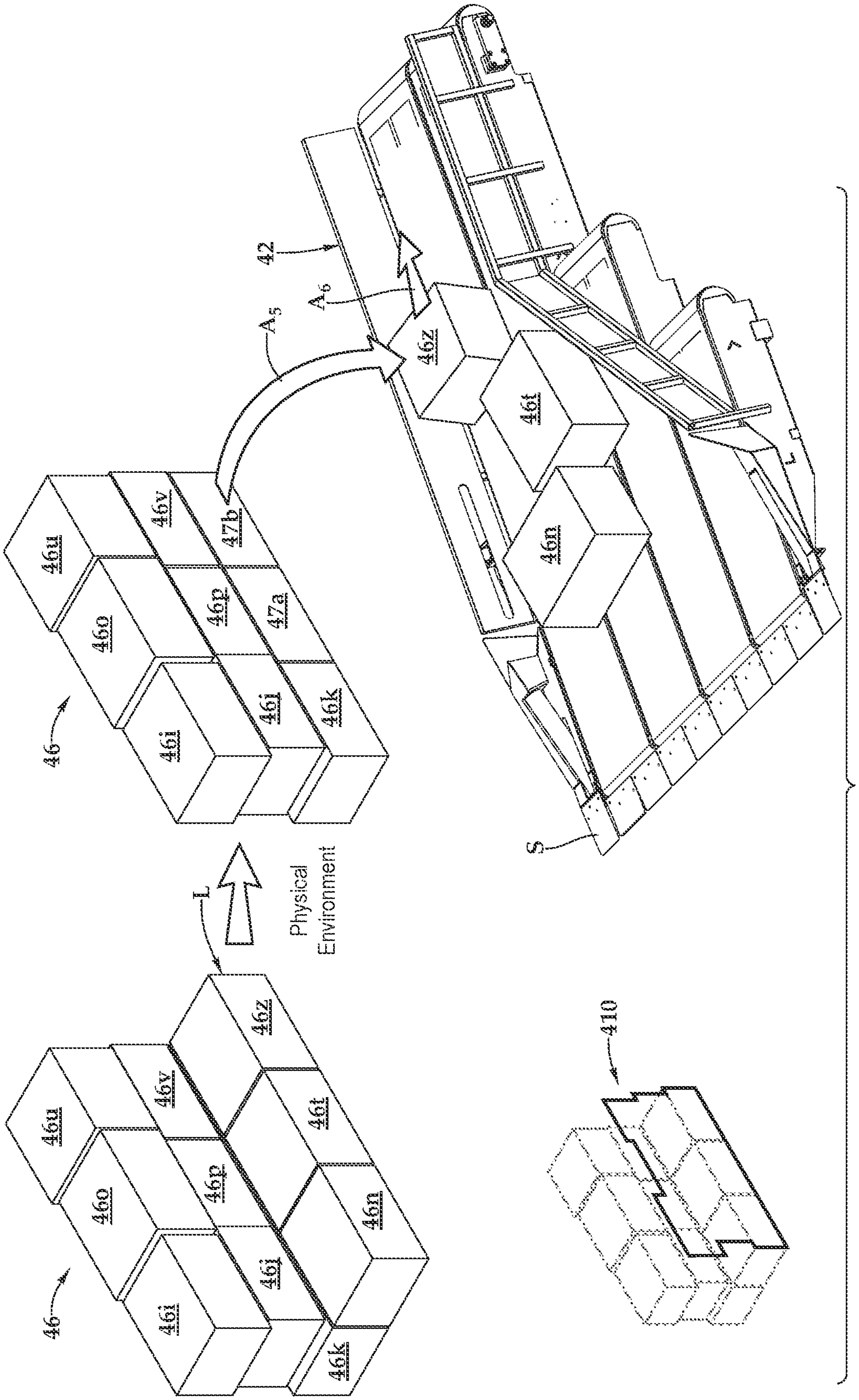
FIG. 14 is a schematic diagram of one embodiment of the perception-based robotic manipulation system in a fourth operational embodiment.

FIG. 11 depicts one embodiment of the perception-based robotic manipulation system, wherein product is stacked in a physical environment and includes various boxes labeled 46*i*, 46*j*, 46*k*, 46*l*, 46*m*, 46*n*, 46*o*, 46*p*, 46*r*, 46*s*, 46*t*, 46*u*, 46*x*, 46*y*, 46*z*, 47*a* (FIG. 14), and 47*b* (FIG. 14). Operationally, in general, the robotic truck unloader 10 picks product 46 with the industrial robot 40 by grasping and pulling parcels onto the pivoting front conveyor 42 which provides conveyance through the robotic truck unloader 10 to further outbound conveyance, such as the telescoping conveyor unit presented in FIGS. 1A-1D, and onto downstream systems.

More particularly, in one embodiment, an operator positions the robotic truck unloader 10 having the industrial robot 40 and pivoting front conveyor 42 proximate the trailer opening 46 utilizing the programmable logic controller and the distance measurement subassembly 170 to position the robotic truck unloader 10. The robotic truck unloader 10 initially captures multiple data images of the product 46 as represented by multiple 3-D data images 400. The multiple 3-D data images 400 are then converted into a composite 3-D model 402 and then a filtered 3-D model 404. In some embodiments, the multiple 3-D data images capture the complete scene. Product identification 406 identifies a foreground wall W, which corresponds to physical parcels 46*l*, 46*m*, 46*n*, 46*r*, 46*s*, 46*t*, 46*x*, 46*t*, and 46*z*. In some implementations, the foreground wall W is divided into an upper portion U and a lower portion L. The upper portion U corresponds to parcels 46*l*, 46*m*, 46*r*, 46*s*, 46*x*, and 46*y*. The lower portion L corresponds to parcels 46*n*, 46*t*, 46*z*. In some implementations, the upper portion U includes product having no direct contact with the floor FL and the lower portion L includes product having direct contact with the floor FL.

Product dimensioning 408 occurs to identify a candidate product contact face T, which may be based on prioritization and have the form of a capital "T" and corresponds to parcels 46*r*, 46*s*, 46*x*, and 46*l*. In some embodiments, the candidate product face T is located within upper portion P. As part of these operations, candidate contact surfaces are generated and evaluated for the likelihood of successful picking. Candidates may then be prioritized based on spatial distribution to optimize product throughput, which may have the form of a capital "T". In this example, the resulting candidates correspond to parcels 46*r*, 46*s*, 46*x*, and 46*y*. The industrial robot 40 is then given a command to remove the parcels 46*r*, 46*s*, 46*x*, and 46*y* from the stack of product 46. As shown, in FIG. 11, the industrial robot 40 may grasp parcels of different dimensions with uneven surface utilizing the compliance of the end effector. The industrial robot 40 then pulls the parcels 46*r*, 46*s*, 46*x*, and 46*y* from the stack of product 46 onto the pivoting front conveyor 42, which catches the parcels 46*r*, 46*s*, 46*x*, and 46*y*. The robotic truck unloader 10 may repeat the pick utilizing the grasp and pull process of the industrial robot 40 as required until the area above the pivoting front conveyor 42 is empty.

Figure 12:
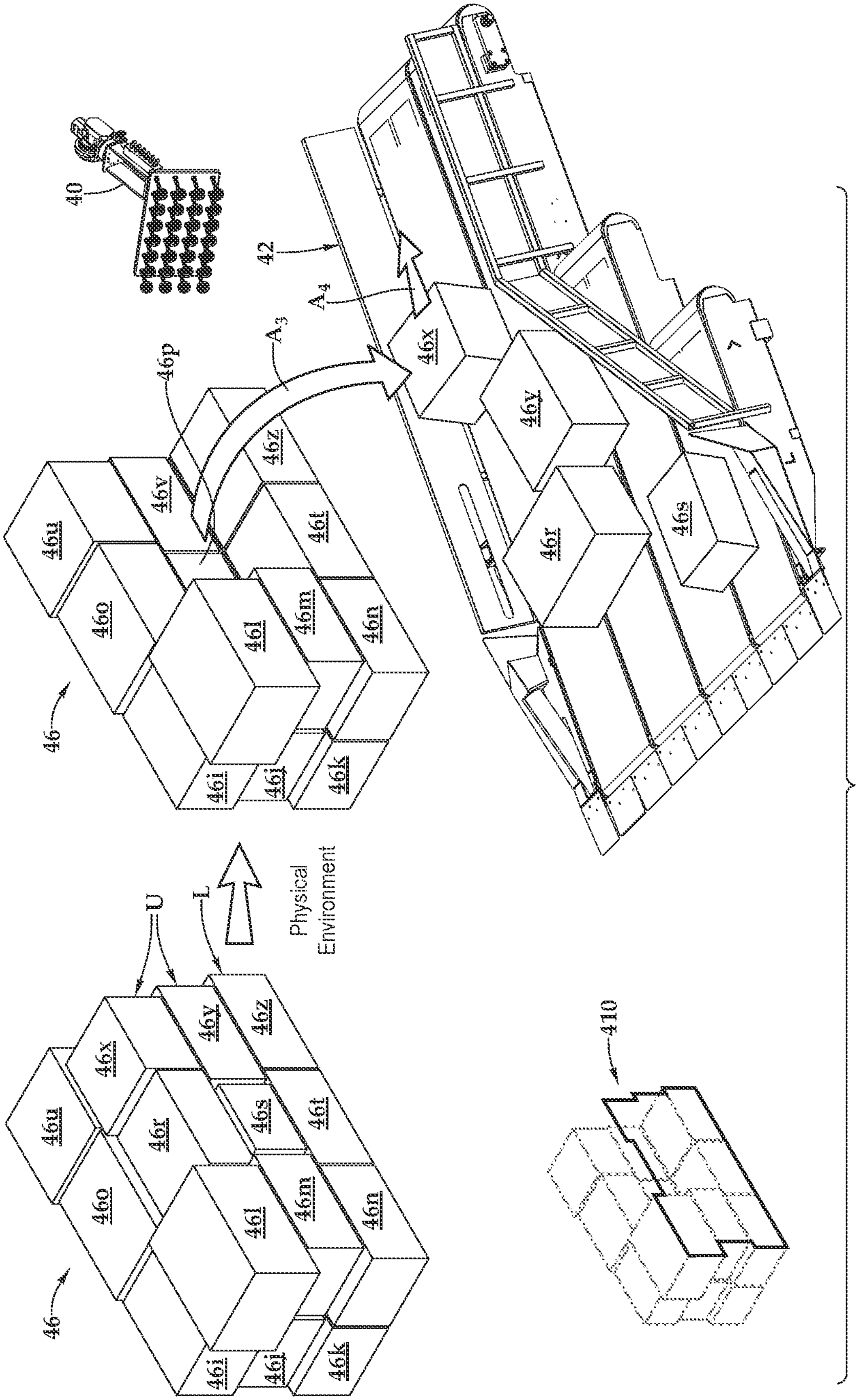
FIG. 12 is a schematic diagram of one embodiment of the perception-based robotic manipulation system in a second operational embodiment.

Referring now to FIG. 12 and continuing with the machine operating sequence presented in FIG. 11, the parcels 46*r*, 46*s*, 46*x*, and 46*y* are picked utilizing a grasp and pull technique as shown by arrow $A_3$ onto the pivoting front conveyor 42 by the industrial robot 40 to travel downstream as shown by arrow $A_4$. The pivoting front conveyor 42 catches the parcels 46*r*, 46*s*, 46*x*, and 46*y*. Such an operation is represented by operation 410, where articulation in the pivoting front conveyor 42 may include a scoop. Then, once a specified height of parcels is reduced, such as approximately a first few lower rows of parcels remaining (e.g., parcels 46*n*, 46*t*, and 46*z* remaining) in the lower portion L, the robotic truck unloader 10 may then cause the pivoting front conveyor 42 to articulate to an scoop, if necessary, for the remaining parcels. The lower portion L with the upper portion U removed may be considered an evacuated front area, which is subjacent to the candidate product contact face T, that is scooped by the pivoting front conveyor 42. It should be understood that more than one scoop operation may be employed. Moreover, scoop operations of different depths, such as shallow and deep, may be utilized.

Figure 13:
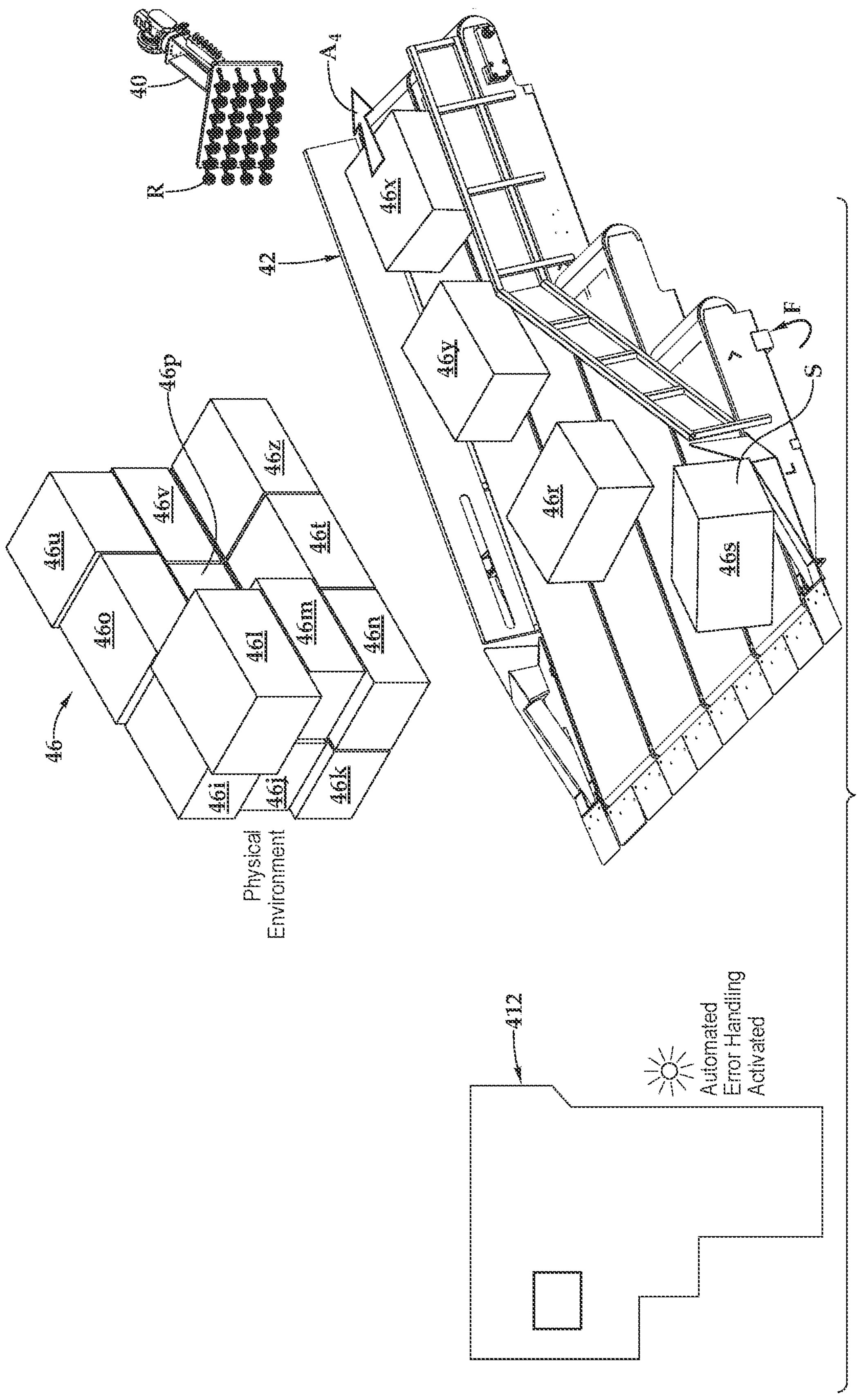
FIG. 13 is a schematic diagram of one embodiment of the perception-based robotic manipulation system in a third operational embodiment.

Referring now to FIG. 13 and continuing with the machine operating sequence presented in FIGS. 11 and 12, in this example, prior to scooping the remaining product 46 on the lower portion L, the robotic truck unloader 10 utilizes automated error handling at operation 412 to detect that the parcel 46*s* is not advancing through conveyance and is stuck, as shown by letter S, on the pivoting front conveyor 42. The automated error handling functionality of the robotic truck unloader 10 may then utilize wings 300, 302 and in particular, the wing 302, to reposition the parcel 46*s* such that the parcel 46*s* may continue to travel downstream through conveyance. Alternatively, the automated error handling functionality of the robotic truck unloader 10 then causes the industrial robot 40 to reposition, as shown by repositioning R, to engage the parcel 46*s* on the pivoting front conveyor 42 such that the parcel 46*s* may continue to travel downstream through conveyance. It should be appreciated, however, that in some implementations, as a further addition or alternative, the automated error handling functionality of the robotic truck unloader 10 may cause the pivoting front conveyor 42 to agitate the parcel 46*s*. Such agitation may be caused moving the pivoting front conveyor 42 up and down or alternating the directional operation of the conveyor units of the pivoting front conveyor 42. As shown in FIG. 14, once the parcel 46*s* is freed by the automated error handling, the robotic truck unloader 10 scoops the remaining product 46 on the lower portion L, which includes parcels 46*n*, 46*t*, 46*z*, with this downstream conveyance represented by arrows $A_5$, $A_6$. In one embodiment, the pivoting front conveyor 42 of the robotic truck unloader 10 advances forward with a driving scoop to engage the product 46 on the lower portion L. Thereafter, the robotic truck unloader 10 may be repositioned and following the necessary navigation and perception operations, the industrial robot 40 may perform a pick including grasp and pull and the pivoting front conveyor 42 conveying picked product then executing a series of scoops. Such a machine operating sequence presented in FIGS. 9-12 may continue until the end of the trailer is detected by the perception system of the robotic truck unloader 10.

FIG. 13 depicts one embodiment of a method for perception-based robotic manipulation. In some embodiments, at block 420, the distance measurement subassembly captures data from different views of the product. More particularly, 3-D data images are collected from the distance measurement subassembly and at block 422, coordinate transformations occur. In one embodiment, in order to perform product operations, such as box picking operations, including grasping and pulling, using perception data, coordinates observed by the distance measurement subassembly, which may include one or more cameras, are transformed to the reference frame. By way of example and not by way of limitation, the following coordinate system may be defined:

The camera coordinate system {c}, in which the RGB-D point cloud data is originally expressed The robot coordinate system {r}, located at the base of the manipulator A homogenous transformation matrix is defined from the distance measurement subassembly and in some embodiments, the camera, to a robot coordinate system, which may be obtained using a hand-eye calibration procedure or other suitable calibration procedure. By way of example, such calibration procedures may be performed offline when the distance measurement subassembly is installed or maintained, and the resulting transformation stored for future use. A point originally expressed in the camera coordinate system, cp, can then transformed to the robot base using Equation 1.

$$rp=crH*cp \quad \text{Equation 1:}$$

At block 424, the 3-D data images are stitched together into a 3-D model which may be a partial model and, in one implementation, a partial 3-D point cloud data model. At block 426, areas of non-interest are filtered out within the 3-D model to create a world space model. Areas of non-interest may include side walls, ceiling, floor and a conveyor plane, which may be constructed by two 3D data points provided by the PLC. At block 428, a region-based segmentation algorithm is employed and the foreground wall is identified. At block 430, various spatial metrics are computed that can determine if the position of the pivoting front conveyor is to be moved to expose more of the wall or the current wall has been depleted. At decision block 432, if the wall is depleted and candidate picks are not possible, then the methodology advances to block 452 (discussed below) with a communication to the programmable logic controller that no validate candidates exist at block.

At block 434, applicable filters are applied before a set of valid candidates is determined. A candidate product contact face may belong to at least one candidate product and is computed using a sliding window method, described in block 436. At block 436, with an application of filters, a set of candidate contact faces are generated using a sliding window method that can extract contact faces based on a dynamically generated grid structure. Following, at block 438, each candidate is evaluated for quality of surface and likelihood of successful extraction based on spatial and geometric features. Thereafter, the candidate products are ranked based on spatial distribution at block 440 and based on how many previous attempts have been made in that region at block 442.

At block 444, an optimal candidate is selected, which may include removal of the product by a picking operation including grasping and pulling by the industrial robot followed by catching by the pivoting front conveyor, which is simulated at block 446 before an interference check is run at block 448. At block 450, a determination is made if the pivoting front conveyor position requires modification for the following pick cycle. At block 452, an instruction is sent to the programmable logic controller to control the end effector of the industrial robot to remove the product, which, as mentioned, may be a box or parcel. This instruction may additionally include directives to adjust the pivoting front conveyor position or execute one or more scoops to remove remaining product. At block 454, automated error handling is executed, if necessary.

Figures 15, 16:
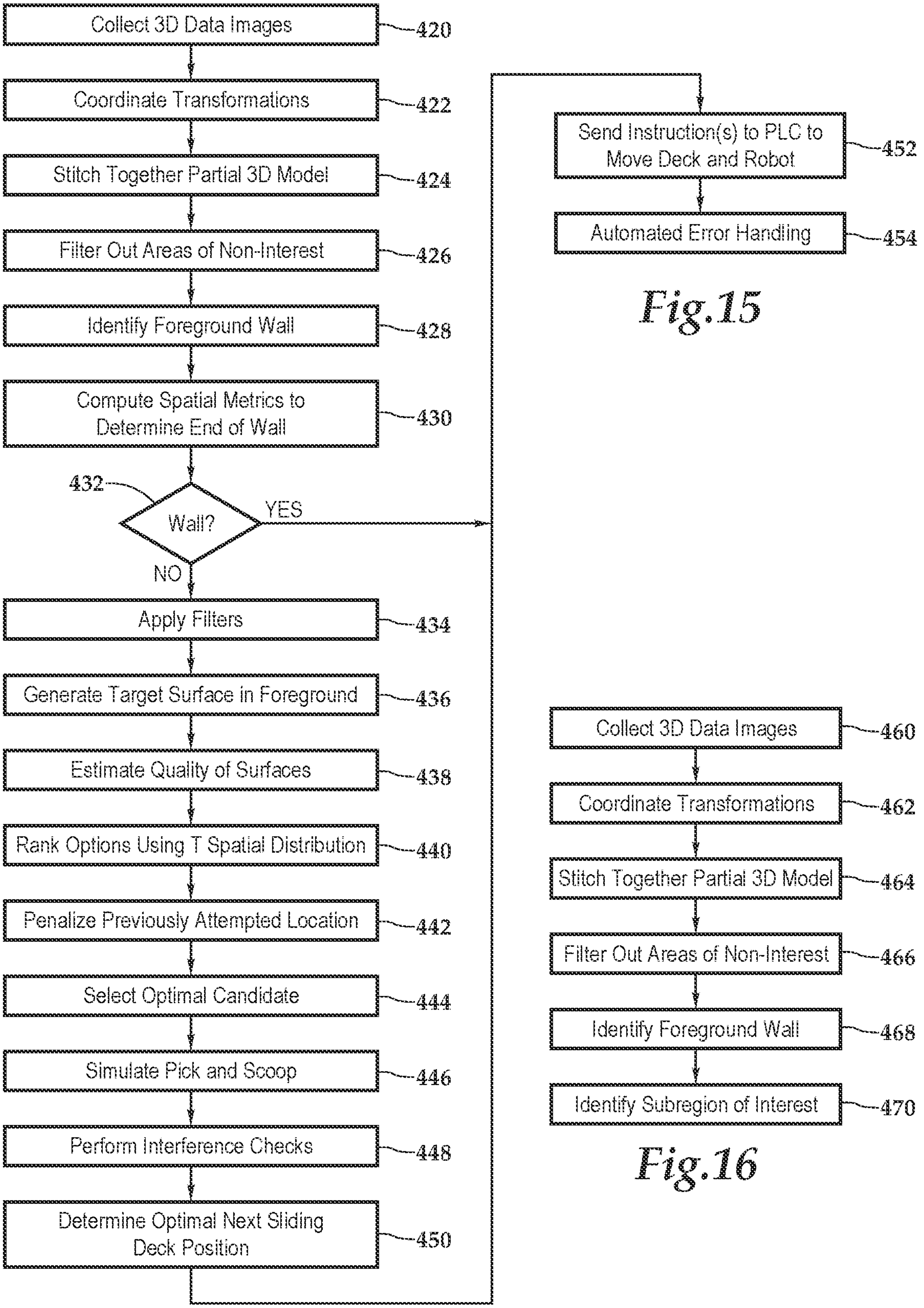
FIG. 15 is a flow chart depicting one embodiment of a method for perception-based robotic manipulation.
FIG. 16 is a flow chart depicting one embodiment of a method for perception-based robotic manipulation of product.

FIG. 16 depicts one embodiment of a method for perception-based conveyor optimal conveyor positioning. In some embodiments, at block 460, the distance measurement subassembly captures data from different views of the product including 3-D data images. At block 462, coordinate transformations occur. In one embodiment, in order to perform box picking operations, including grasping and pulling, using perception data, coordinates observed by the camera are transformed to the reference frame. By way of example and not by way of limitation, the following coordinate system may be defined:

The camera coordinate system {c}, in which the RGB-D point cloud data is originally expressed The robot coordinate system {r}, located at the base of the manipulator A homogenous transformation matrix is defined from the camera to robot coordinate system, crH, which may be obtained using a hand-eye calibration procedure. This may be performed offline when the distance measurement subassembly includes camera is installed on the system, and the resulting transformation is stored for future use. A point originally expressed in the camera coordinate system, cp, can then transformed to the robot base using Equation 1.

$$rp = crH * cp \quad \text{Equation 1}$$

At block 464, the 3-D data images are stitched together into a 3-D model which may be a partial model and, in one implementation, a partial 3-D point cloud data model. At block 466, areas of non-interest are filtered out within the 3-D model to create a world space model. By way of example and not by way of limitation, areas of non-interest may include side walls, ceiling, floor, and a conveyor plane, which may be constructed by two 3D data points provided by the PLC. At block 468, a region-based segmentation algorithm is employed and the foreground wall is identified. Then, at block 470, a subregion of interest is computed using various spatial metrics that can determine the highest 3D point of our remaining partial 3-D point cloud model. To determine the conveyor positioning.

Figure 17:
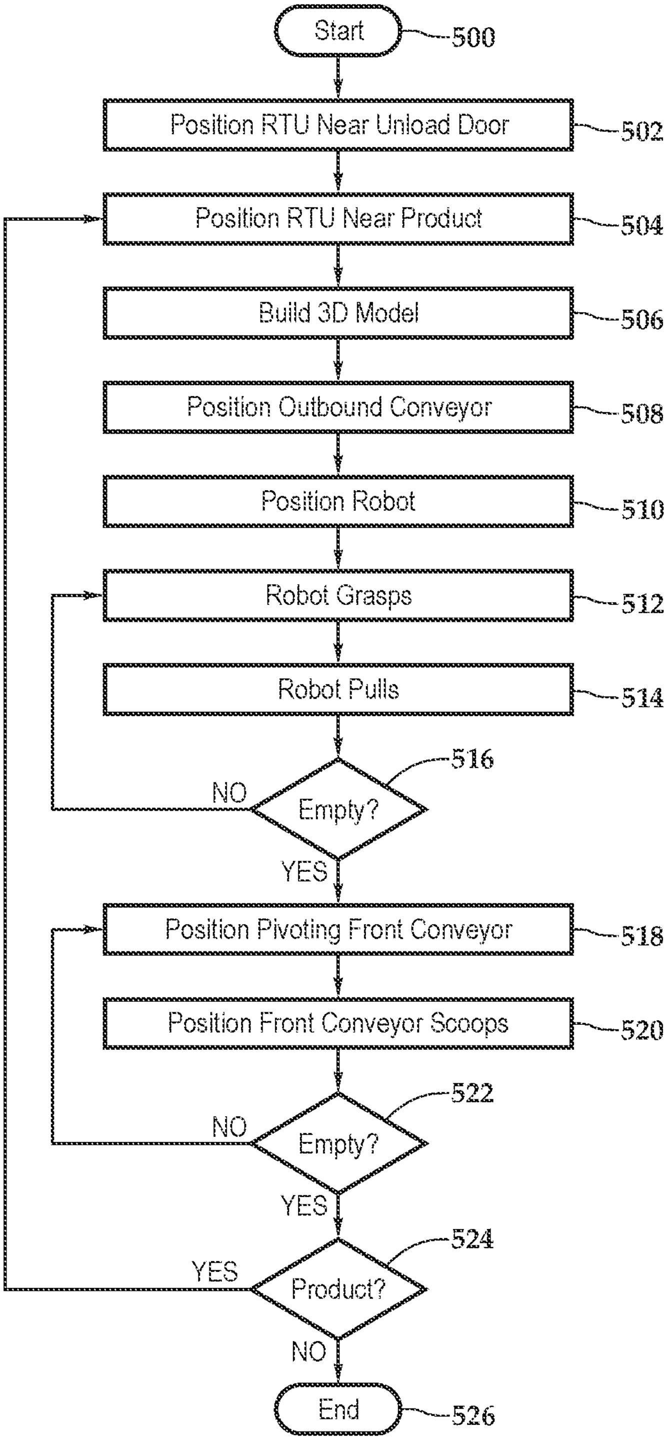
FIG. 17 is a flow chart depicting one operational implementation of the robotic truck unloader unloading product.

FIG. 17 depicts one operational implementation of the robotic truck unloader unloading product from a truck or container, for example. The methodology starts at block 500 before proceeding to block 502 where the robotic truck unloader is positioned near an unload door to the truck or the container having the product. In this step, an operator may move the robotic truck unloader close to the unload door and ensure the robotic truck unloader is ready for operation, including functioning safety systems. At block 504, the robotic truck unloader is positioned near the product with, for example, the programmable logic controller 372 and distance measurement subassembly 170 working in conjunction to guide the robotic truck unloader a specified distance from the product. At block 506, a 3D model is built of the loaded product and the surrounding environment as discussed in FIGS. 12 and 13, for example.

At block 508, a conveyance subassembly, which may include an outbound conveyor providing a powered transportation path, is appropriately positioned for handling the product based on the data gathered by creating the 3D model. At block 510, an industrial robot of the robotic truck unloader is also appropriately positioned for handling the product based on the data gathered by creating the perception-based model. At block 512, the industrial robot grasps product and at block 514, the industrial robot pulls the product onto the pivoting front conveyor for transportation down the conveyance subassembly. At decision block 516, if the area where the industrial robot was grasping and pulling is empty, then the methodology advances to block 518. On the other hand, if the space with product above the pivoting front conveyor is not empty, then the grasping and pulling operations described in blocks 512 and 514 are repeated. That is, in general, in some embodiments, the methodology recaptures data after every pick and then determines emptiness as the pivoting front conveyor is appropriately lowered to accommodate picking. Once a threshold is reached, then the scooping occurs.

At block 518, the pivoting front conveyor is positioned by articulating the pivoting front conveyor down to a specified height corresponding to the remaining product. At block 520, the pivoting front conveyor executes a scoop by driving the unit forward to place an elongated blade of the pivoting front conveyor under the product and scooping. At decision block 522, if the space where the pivoting front conveyor was scooping is empty then the methodology advances to decision block 524; otherwise, the articulation and scooping operations of blocks 518, 520 is repeated. At decision block 524, if product remains to be unloaded, then the methodology returns to block 504. If the product is unloaded, on the other hand, then the methodology ends at block 526, where the robotic truck unloader may exit the trailer or container. As previously mentioned, with the systems and methods presented herein related to the robotic truck unloader utilize the navigation and perception-based technology presented herein permit the grasping and pulling of product, such as parcels, without regard to where the individual instances of product are located and without regard to prior knowledge of the environment (e.g., dimensions of the truck). The product is grasped and pulled by the industrial robot onto the pivoting front conveyor and conveyance subassembly for further transport. The movement and articulation of the pivoting front conveyor permit the robotic truck unloader to be close to the location of the product in order to limit the distance traveled for outbound conveying to various downstream systems.

The order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A robotic truck unloader for unloading/unpacking a plurality of product, the robotic truck unloader comprising:

a mobile base structure having first and second ends;

a drive subassembly coupled to the mobile base, the drive subassembly including a plurality of wheels for steering and driving the mobile base;

a conveyance subassembly disposed on the mobile base, the conveyance subassembly including a powered transportation path configured for transporting the plurality of product between the first end and the second end;

a pivoting front conveyor disposed at the second end of the mobile base, the pivoting front conveyor having a deck conveyor unit integrated therewith, the deck conveyor unit configured for transporting the plurality of product to the conveyance subassembly, the pivoting front conveyor configured to handle the plurality of product;

the deck conveyor unit including a plurality of conveyor subassemblies;

a plurality of lateral skirt plates located on the pivoting front conveyor, the plurality of lateral skirt plates configured to guide the plurality of product through the deck conveyor unit;

a plurality of sensors positioned to monitor the pivoting front conveyor;

a control subassembly located in communication with the pivoting front conveyor, the deck conveyor unit, and the plurality of sensors, the control subassembly coordinating selective articulated movement of the pivoting front conveyor, the control subassembly coordinating selective actuation of each of the plurality of conveyor subassemblies of the deck conveyor unit; and the control subassembly including a memory accessible to a processor, the memory including processor-executable instructions that, when executed cause the processor to:

specify a search operation within the pivoting front conveyor via the plurality of sensors to identify a product in-handling located on the pivoting front conveyor, and specify, in response to the product in-handling located on the pivoting front conveyor, an automatic error handling operation, the automatic error handling operation including the selective actuation of each of the plurality of conveyor subassemblies of the deck conveyor unit.

2. The robotic truck unloader as recited in claim 1, wherein the pivoting front conveyor is fixedly secured to the robotic truck unloader for each of pivoting, extension, and retraction relative to the robotic truck unloader.

3. The robotic truck unloader as recited in claim 1, wherein the pivoting front conveyor further comprises a frame secured to the second end of the mobile base by an actuated subassembly.

4. The robotic truck unloader as recited in claim 1, wherein the pivoting front conveyor further comprises:

a frame secured to the second end of the mobile base, the frame being inflexible;

a planar, elongated blade exhibiting a rear portion connected to the frame, and a front portion extending a length from the rear portion along an transverse axis between first and second lateral sides;

the planar, elongated blade, in response to applied pressure, flexing about the transverse axis.

5. The robotic truck unloader as recited in claim 4, wherein the planar, elongated blade further comprises spring steel.

6. The robotic truck unloader as recited in claim 4, wherein the planar, elongated blade further comprises ultra-high-molecular-weight polyethylene.

7. The robotic truck unloader as recited in claim 4, wherein the planar, elongated blade further comprises a flexible material providing abrasion, impact, and chemical resistance.

8. The robotic truck unloader as recited in claim 4, wherein the planar, elongated blade, in response to applied pressure, flexes about the transverse axis to comply with a shape of an object applying the pressure thereat.

9. The robotic truck unloader as recited in claim 1, wherein the automatic error handling operation further comprises an agitation of the pivoting front conveyor beneath the product in-handling.

10. The robotic truck unloader as recited in claim 1, wherein the processor-executable instructions that, when executed, cause the processor to specify, in response to the product in-handling located on the pivoting front conveyor, an automatic error handling operation, further comprise processor-executable instructions that, when executed, cause the processor to:

specify, in response to the product in-handling located on the pivoting front conveyor, a command operation to selectively alternate at least one of the plurality of conveyor subassemblies forward and reverse.

11. The robotic truck unloader as recited in claim 1, wherein the processor-executable instructions that, when executed, cause the processor to specify, in response to the product in-handling located on the pivoting front conveyor, an automatic error handling operation, further comprise processor-executable instructions that, when executed, cause the processor to:

specify, in response to the product in-handling located on the pivoting front conveyor, a command operation to selectively move the pivoting front conveyor up and down.

12. The robotic truck unloader as recited in claim 1, further comprising processor-executable instructions that, when executed, cause the processor, prior to specifying the search operation, to:

specify a deep scoop removal operation to unload the plurality of product with the pivoting front conveyor, and specify a shallow scoop removal operation to unload the plurality of product with the pivoting front conveyor.

13. The robotic truck unloader as recited in claim 1, further comprising processor-executable instructions that, when executed, cause the processor, prior to specifying the search operation, to:

specify a deep scoop removal operation to unload the plurality of product with the pivoting front conveyor at an evacuated front area, the evacuated front area being subjacent to the candidate product contact face, and specify a shallow scoop removal operation to unload the plurality of product with the pivoting front conveyor at the evacuated front area.

14. The robotic truck unloader as recited in claim 1, further comprising:

an industrial robot disposed proximate the second end of the mobile base, the industrial robot being configured to handle the plurality of product, the industrial robot having a robot reachable space;

a camera; and the control subassembly being located in communication with the industrial robot, the camera, the control subassembly coordinating selective articulated movement of the industrial robot.

15. The robotic truck unloader as recited in claim 14, further comprising processor-executable instructions that, when executed, cause the processor to:

specify a removal operation to unload the plurality of product with the industrial robot.

16. The robotic truck unloader as recited in claim 14, wherein the processor-executable instructions that, when executed, cause the processor to specify, in response to the product in-handling located on the pivoting front conveyor, an automatic error handling operation, further comprise processor-executable instructions that, when executed, cause the processor to:

specify, in response to the product in-handling located on the pivoting front conveyor, a handling operation to selectively handle the product in-handling on the pivoting front conveyor via the industrial robot.

17. The robotic truck unloader as recited in claim 14, wherein the processor-executable instructions that, when executed, cause the processor to specify, in response to the product in-handling located on the pivoting front conveyor, an automatic error handling operation, further comprise processor-executable instructions that, when executed, cause the processor to:

specify, in response to the product in-handling located on the pivoting front conveyor, a command operation to selectively move the pivoting front conveyor up and down, and specify, in response to the product in-handling located on the pivoting front conveyor, a handling operation to selectively handle the product in-handling on the pivoting front conveyor via the industrial robot.

18. The robotic truck unloader as recited in claim 11, wherein the processor-executable instructions that, when executed, cause the processor to specify a search operation within the pivoting front conveyor via the plurality of sensors to identify a product in-handling located on the pivoting front conveyor, further comprise processor-executable instructions that, when executed, cause the processor to:

utilize the camera to identify the product in-handling located on the pivoting front conveyor.

19. A robotic truck unloader for unloading/unpacking a plurality of product, the robotic truck unloader comprising:

a mobile base structure having first and second ends;

a drive subassembly coupled to the mobile base, the drive subassembly including a plurality of wheels for steering and driving the mobile base;

a conveyance subassembly disposed on the mobile base, the conveyance subassembly including a powered transportation path configured for transporting the plurality of product between the first end and the second end;

a pivoting front conveyor disposed at the second end of the mobile base, the pivoting front conveyor having a deck conveyor unit integrated therewith, the deck conveyor unit configured for transporting the plurality of product to the conveyance subassembly, the pivoting front conveyor configured to handle the plurality of product;

the pivoting front conveyor being fixedly secured to the robotic truck unloader for each of pivoting, extension, and retraction relative to the robotic truck unloader;

the deck conveyor unit including a plurality of conveyor subassemblies;

a plurality of sensors positioned to monitor the pivoting front conveyor;

a control subassembly located in communication with the pivoting front conveyor, the deck conveyor unit, and the plurality of sensors, the control subassembly coordinating selective articulated movement of the pivoting front conveyor, the control subassembly coordinating selective actuation of each of the plurality of conveyor subassemblies of the deck conveyor unit; and the control subassembly including a memory accessible to a processor, the memory including processor-executable instructions that, when executed cause the processor to:

specify a search operation within the pivoting front conveyor via the plurality of sensors to identify a product in-handling located on the pivoting front conveyor, and specify, in response to the product in-handling located on the pivoting front conveyor, an automatic error handling operation, the automatic error handling operation including the selective actuation of each of the plurality of conveyor subassemblies of the deck conveyor unit.

20. A robotic truck unloader for unloading/unpacking a plurality of product, the robotic truck unloader comprising:

a mobile base structure having first and second ends;

a drive subassembly coupled to the mobile base, the drive subassembly including a plurality of wheels for steering and driving the mobile base;

a conveyance subassembly disposed on the mobile base, the conveyance subassembly including a powered transportation path configured for transporting the plurality of product between the first end and the second end;

a pivoting front conveyor disposed at the second end of the mobile base, the pivoting front conveyor having a deck conveyor unit integrated therewith, the deck conveyor unit configured for transporting the plurality of product to the conveyance subassembly, the pivoting front conveyor configured to handle the plurality of product;

the pivoting front conveyor being fixedly secured to the robotic truck unloader for each of pivoting, extension, and retraction relative to the robotic truck unloader;

the deck conveyor unit including a plurality of conveyor subassemblies;

a control subassembly located in communication with the pivoting front conveyor, the deck conveyor unit, and the plurality of sensors, the control subassembly coordinating selective articulated movement of the pivoting front conveyor, the control subassembly coordinating selective actuation of each of the plurality of conveyor subassemblies of the deck conveyor unit; and the control subassembly including a memory accessible to a processor, the memory including processor-executable instructions that, when executed cause the processor to:

specify a search operation within the pivoting front conveyor via the plurality of sensors to identify a product in-handling located on the pivoting front conveyor, and specify, in response to the product in-handling located on the pivoting front conveyor, an automatic error handling operation, the automatic error handling operation including the selective actuation of each of the plurality of conveyor subassemblies of the deck conveyor unit.

* * * * *